(12) United States Patent
Nellessen

(10) Patent No.: US 11,158,446 B2
(45) Date of Patent: Oct. 26, 2021

(54) MAGNET RELEASE

(71) Applicant: John E. Nellessen, Anaheim, CA (US)

(72) Inventor: John E. Nellessen, Anaheim, CA (US)

( * ) Notice: Subject to any disclaimer, the term of this patent is extended or adjusted under 35 U.S.C. 154(b) by 0 days.

(21) Appl. No.: 16/239,363

(22) Filed: Jan. 3, 2019

(65) Prior Publication Data

US 2020/0219641 A1  Jul. 9, 2020

(51) Int. Cl.
*H01F 7/04* (2006.01)
*B25B 11/00* (2006.01)
*B23Q 3/154* (2006.01)

(52) U.S. Cl.
CPC .............. *H01F 7/04* (2013.01); *B25B 11/002* (2013.01); *B23Q 3/1546* (2013.01)

(58) Field of Classification Search
CPC ....... H01F 7/04; H01F 7/0257; B25B 11/002; B23Q 3/1546; B66C 1/04
See application file for complete search history.

(56) References Cited

U.S. PATENT DOCUMENTS

| | | | |
|---|---|---|---|
| 3,452,310 A | 6/1969 | Isrealson | |
| 6,471,273 B1 * | 10/2002 | Friedrich | B66C 1/04 294/65.5 |
| 6,650,212 B1 * | 11/2003 | Weems | B64G 1/641 335/285 |
| 7,850,142 B2 * | 12/2010 | Sladojevic | B25B 11/002 249/219.1 |
| 8,205,846 B2 * | 6/2012 | Glunk | E03C 1/066 248/206.5 |
| 8,876,096 B2 * | 11/2014 | Dixon | B29C 53/04 269/8 |
| 8,915,172 B1 * | 12/2014 | Hood | B27B 27/02 83/446 |
| 9,484,137 B2 | 11/2016 | Kocijan | |

* cited by examiner

*Primary Examiner* — Michael C Zarroli

(57) ABSTRACT

A magnet release device and of the type having a hinge barrel 11 or hinge post 13 affixed to the periphery of the magnet, using a rotating lever arm A 15, which is cam shaped with a leverage tool port 26.

13 Claims, 31 Drawing Sheets

Copy of image from Prior Art
Pat. #3,452,310

Prior Art image
Pat. # US 2004/0239460

Fig. 5A
Fig. 5B
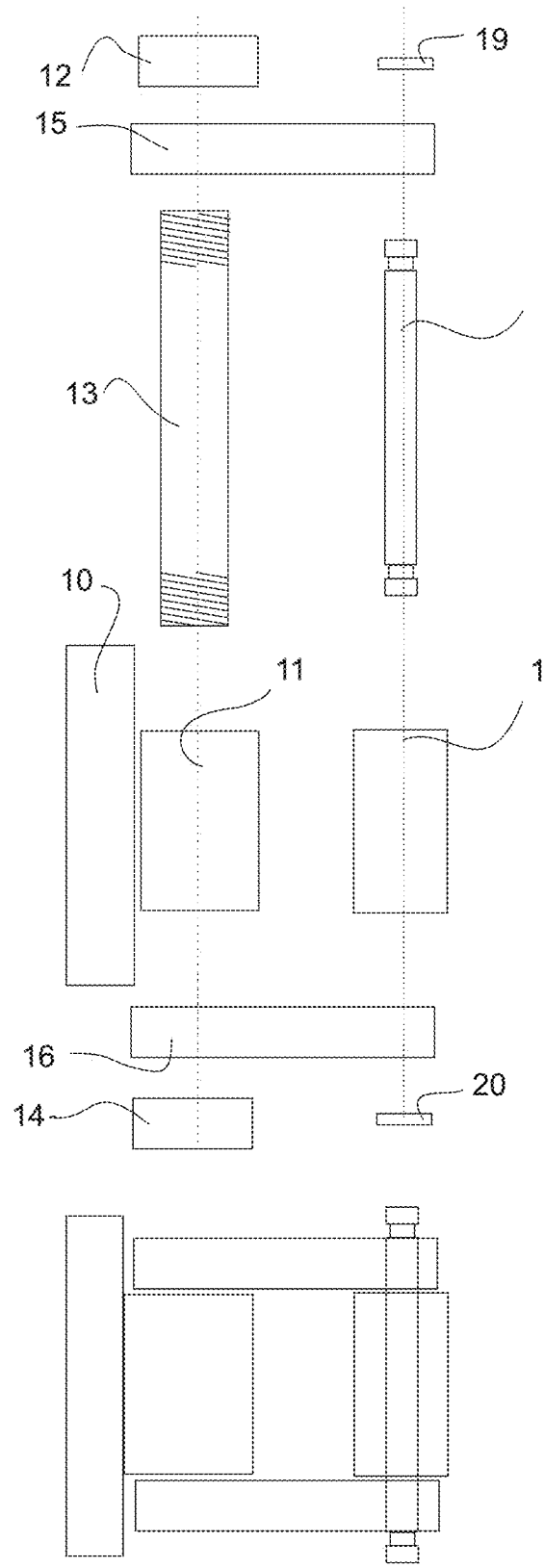
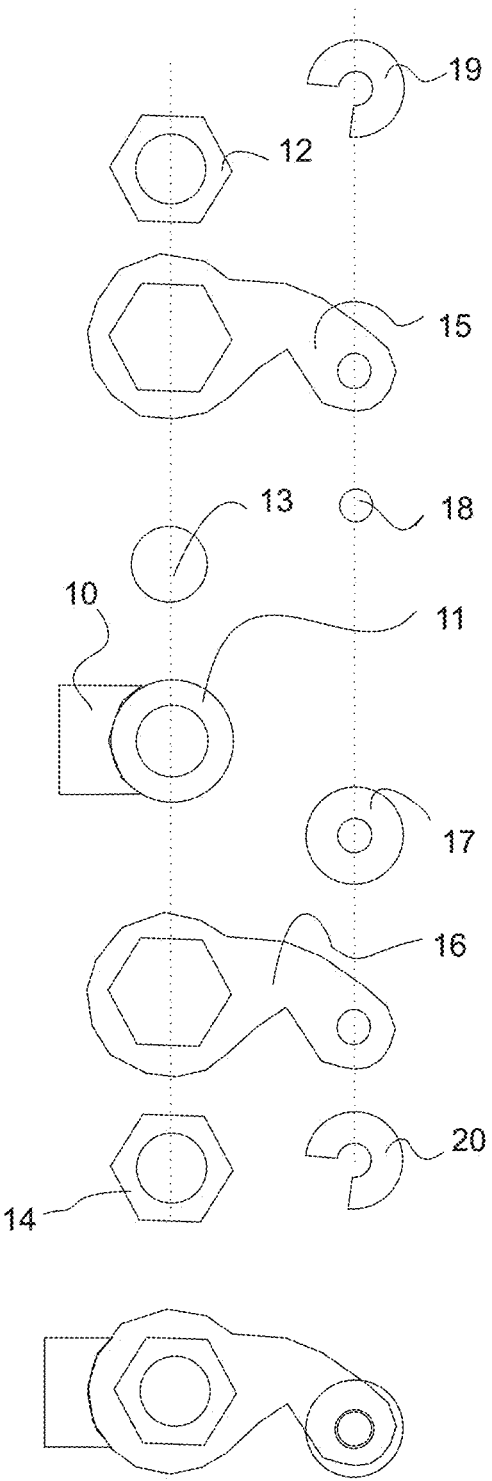

Fig. 9A
Fig. 9B
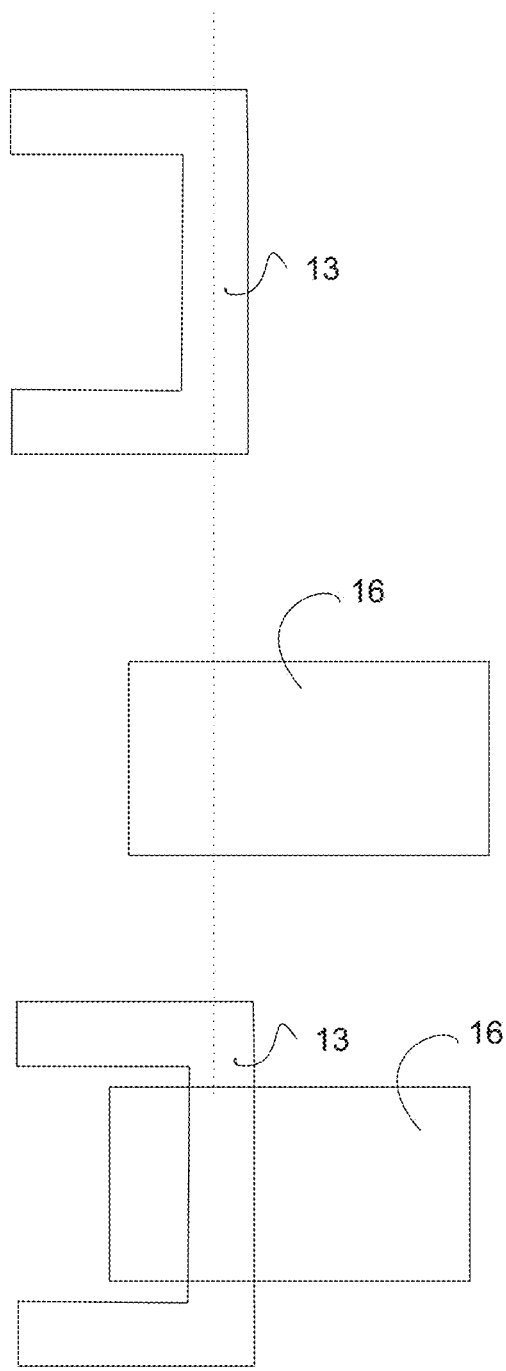
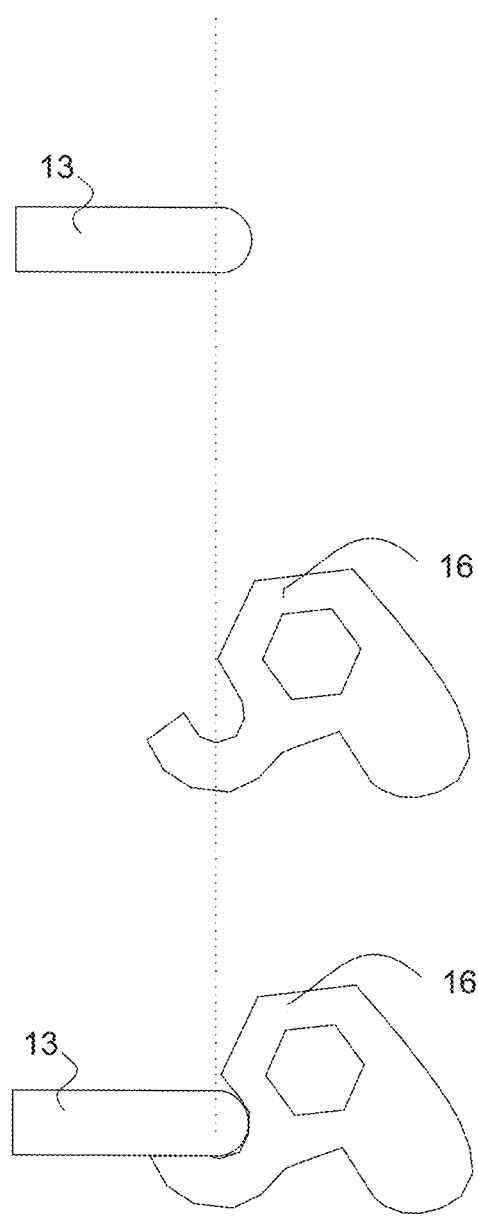

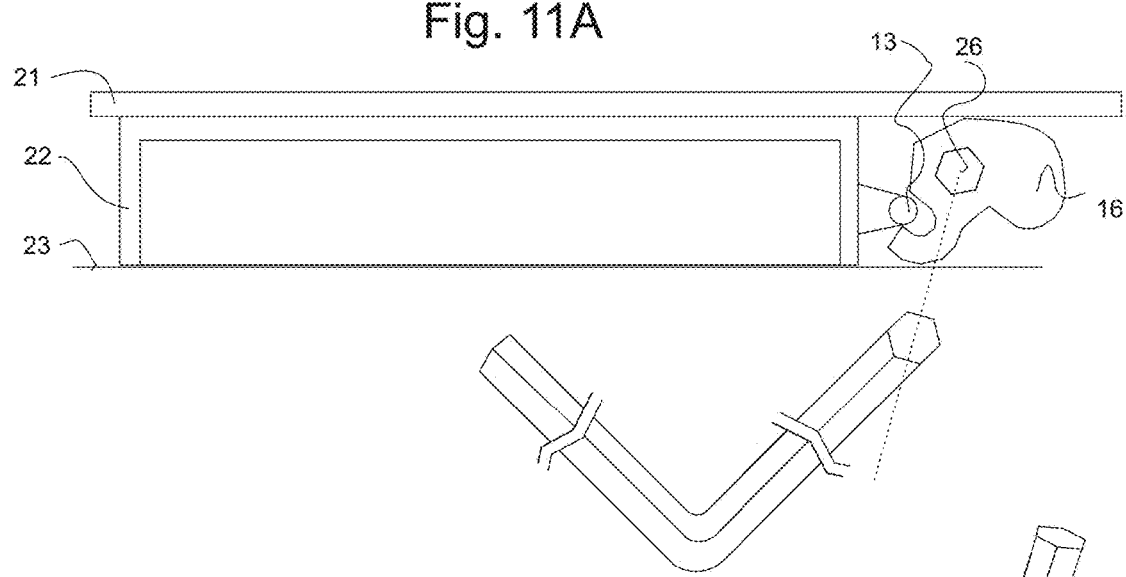
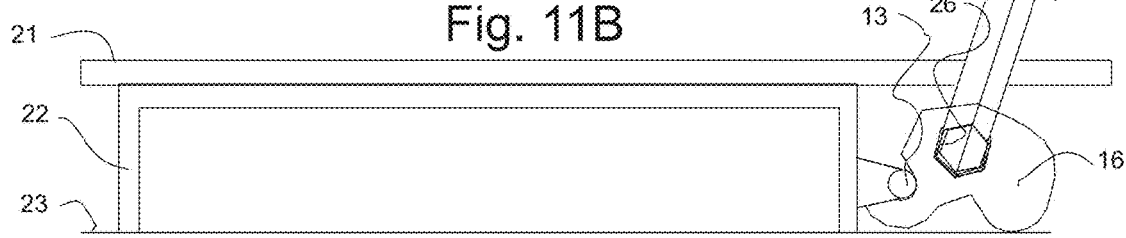
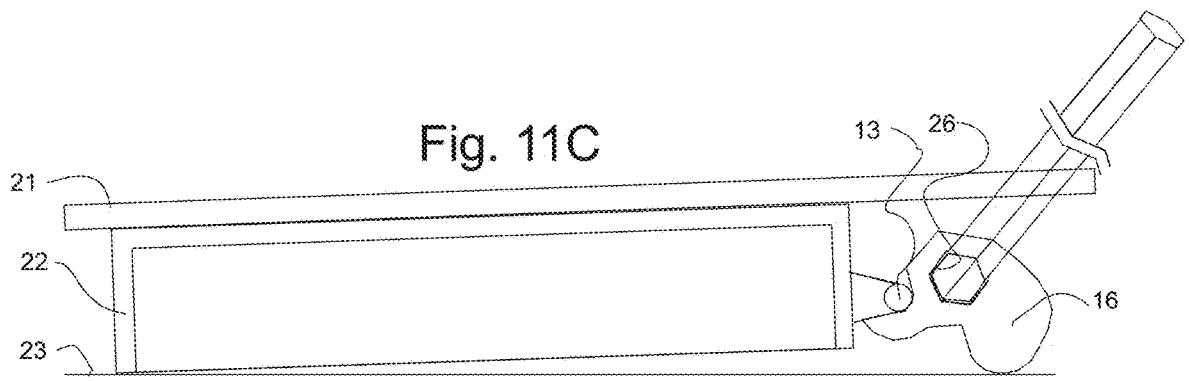

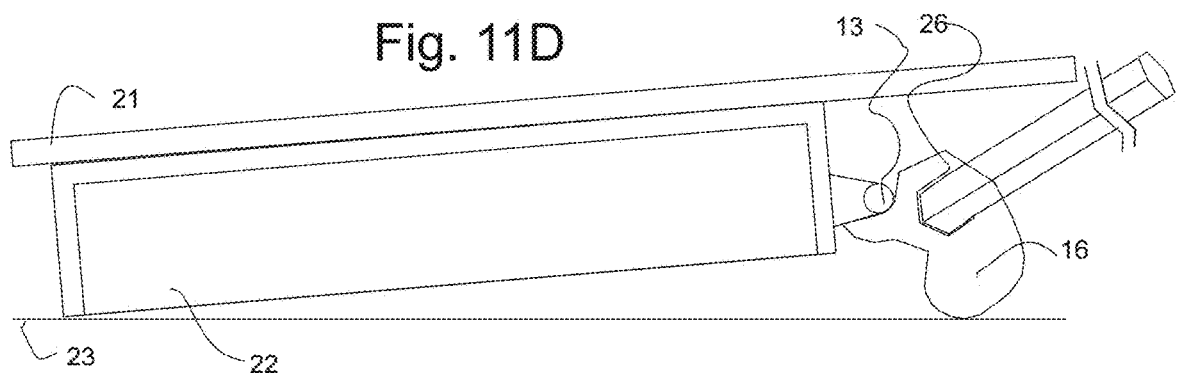
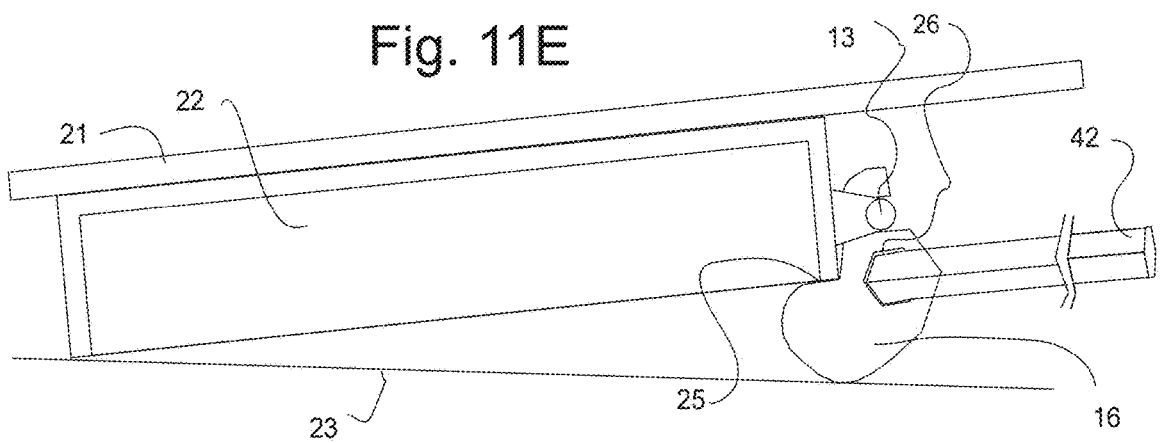
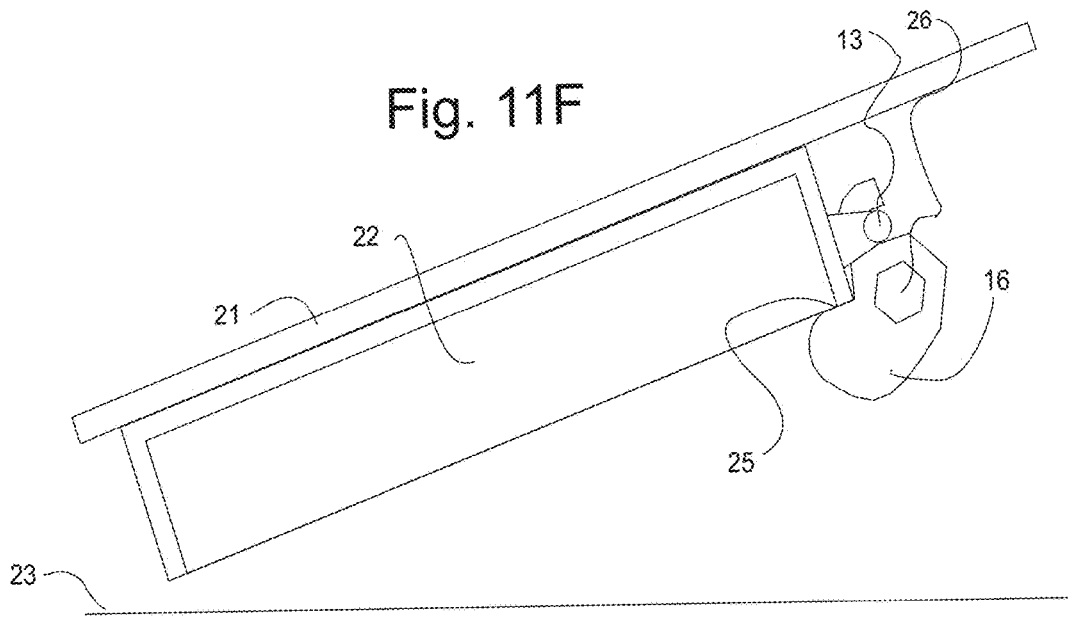

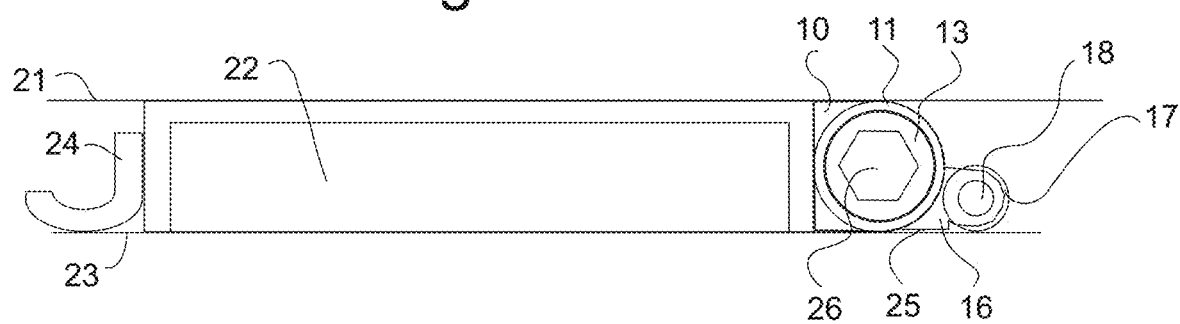
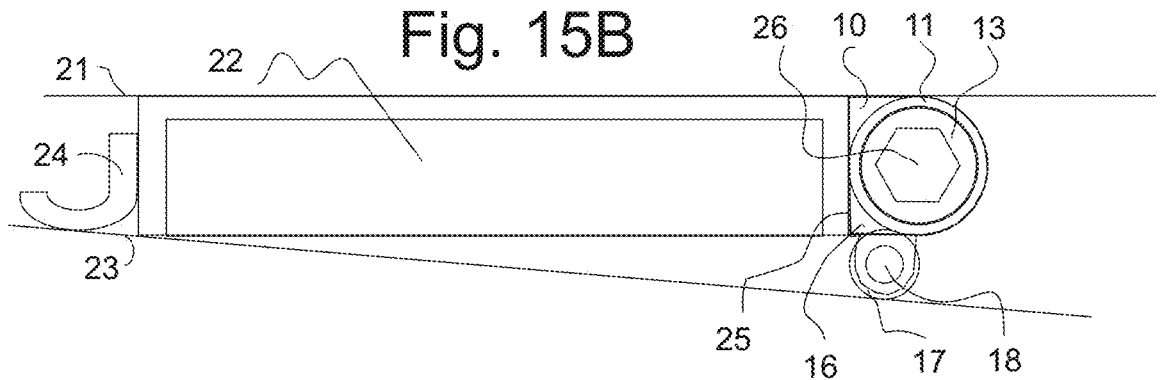

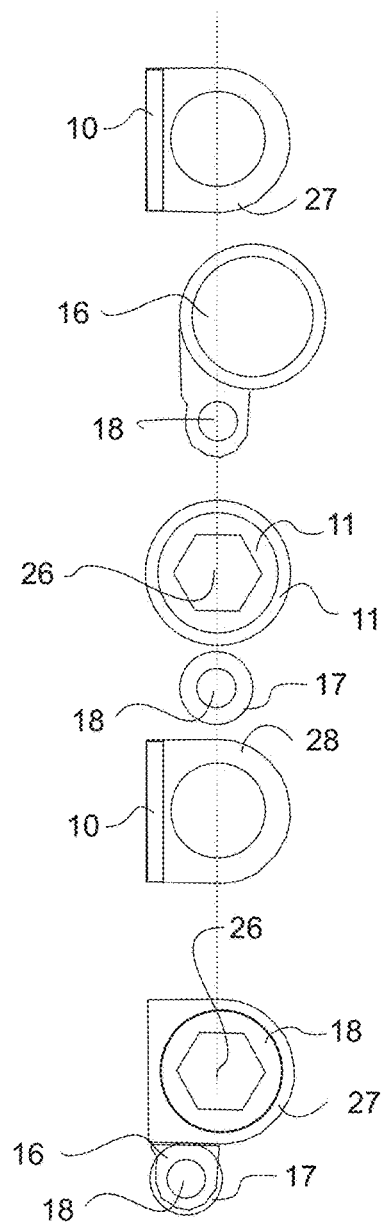
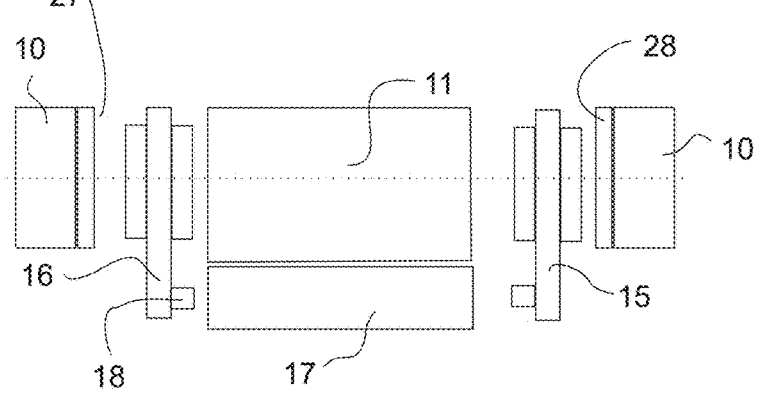

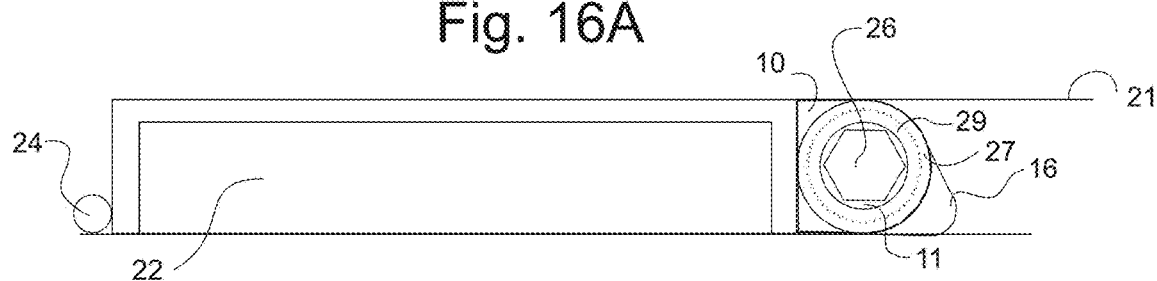
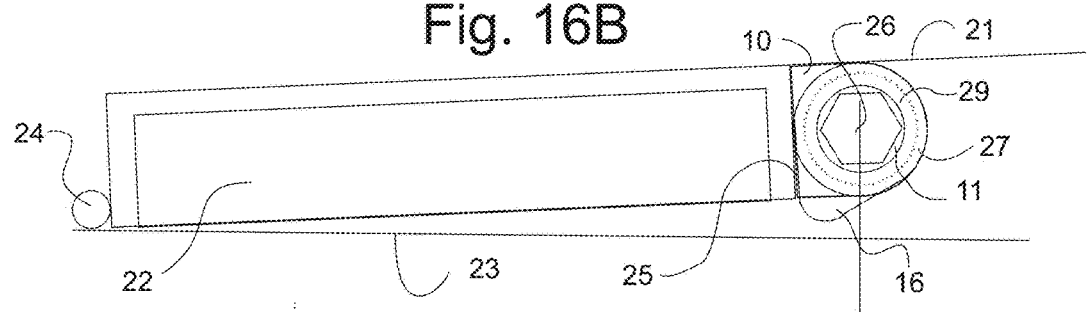
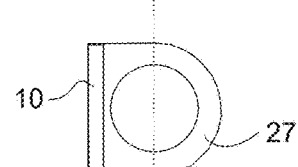
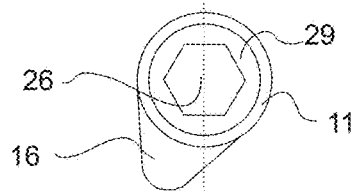
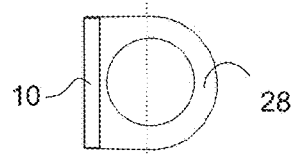
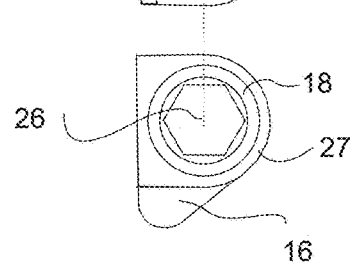
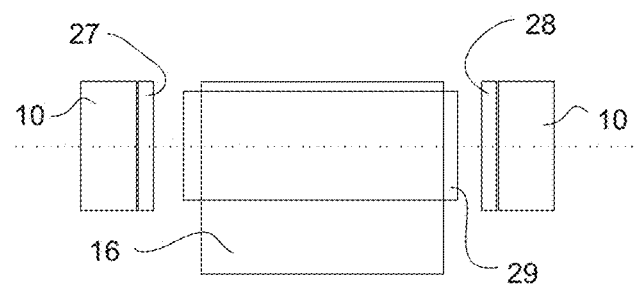

Fig. 18A
Fig. 18B
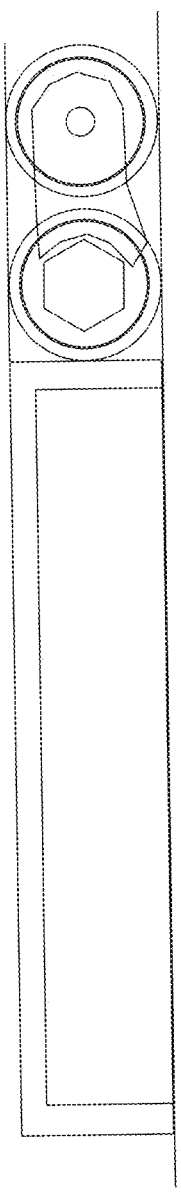
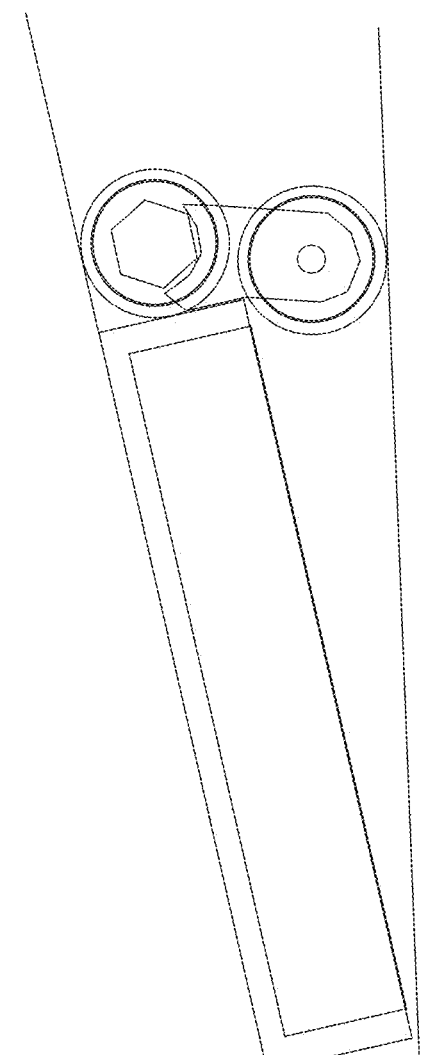

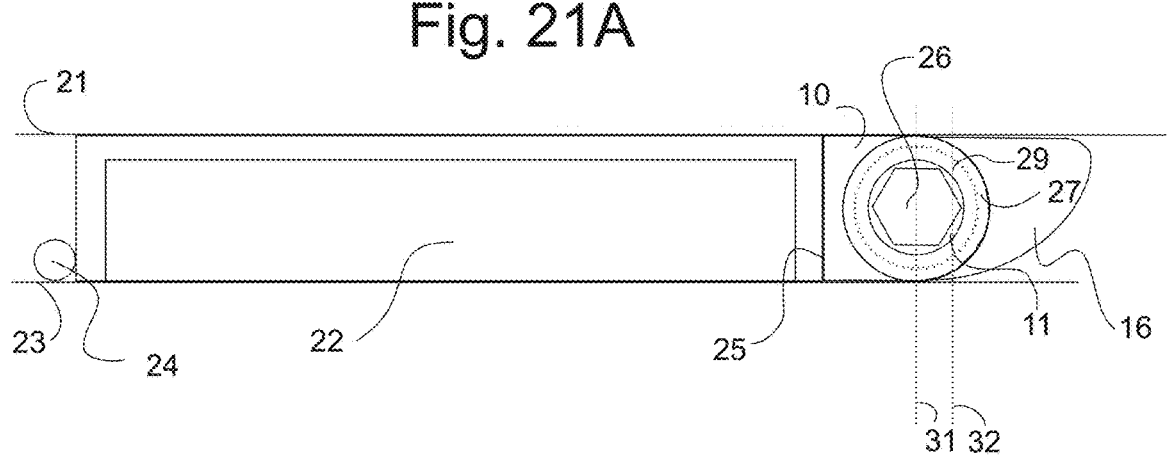
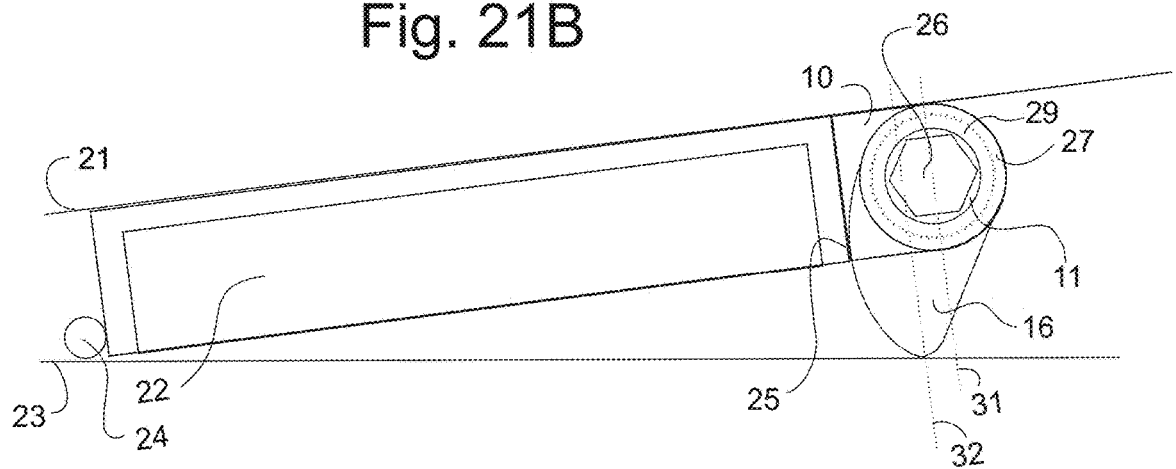

MAGNET RELEASE

FIELD OF THE INVENTION

The present invention relates to a magnet release. Additional aspects of the present invention further relate to various devices including a magnet release.

BACKGROUND OF THE INVENTION

Heretofore, prior art devices for releasing permanent magnet assemblies from holding ferromagnetic objects or for releasing one permanent magnet assembly from holding another permanent magnet assembly, have been complicated internal mechanisms with external handles with an inefficient use of magnet materials. Prior art typically has a housing, at least two internal magnets, at least two ferromagnetic conducting paths, at least one leverage arm with a handle for rotation, sliding, lifting or a combination of motions and at least one point of entry for said leverage arm to pass from the external side of said housing to the inside in order to move at least one of the magnets or at least one of the internal ferromagnetic conducting paths. Magnetic assemblies without a release use more simple parts and are more magnetically efficient with the magnet material used. The ferrous material is assembled with permanent magnets as close to the Ferromagnetic Holding Surfaces (FHS) as possible. The FHS that the magnetic assemblies magnetically attach to generally include Rigid Flat Ferromagnetic Holding Surfaces (RFFHS) and Contoured Ferromagnetic Holding Surfaces (CFHS). Internal magnet release devices operate by adding moving parts inside a magnetic assembly to create distance between the magnet and the FHS or create a short circuit in the magnetic circuit using a ferromagnetic path or create a short circuit in the magnetic circuit using another magnet. The mechanism(s) for releasing is(are) internal and the leverage handle or rotational handle is external. Heretofore one prior art example has created the off position of a magnet steel assembly buy moving the magnet (s) and or steel piece(s) internally to create a magnetic short circuit. This mechanism is an inefficient use of magnet material. It creates distance between the magnet material used and the FHS during the on position. As one skilled in the art will see, the less distance of the magnet material from the FHS the greater the ratio of holding force per gram of magnet material. The further the magnet material is distanced from the FHS during the on position the greater the magnetic losses (see FIG. 1 item 20 in Israelson U.S. Pat. No. 3,452,310 below). These added parts cause the magnetic assembly with internal release to have less holding power than the same amount of magnet material in a magnetic assembly without the internal release. As the cost of rare earth magnets climbs this will become more critical. Isrealson, Ferchland, Bey, Soley, et. Al.

Prior art US PAT #2004/0239460 December 2004 Kocijan—Item 10 and 11 are the magnet material. Together they are roughly the same thickness as they are in diameter. As one skilled in the art will understand, in a holding magnet assembly the magnet material diameter should be from 6 to 10 times the thickness. This ratio keeps the majority of the magnet material near the FHS. The magnetism produced by Magnet 11 is farther from the FHS than in an efficient holding magnet assembly where the magnet material is close to the FHS. The magnet material in 11 is mostly wasted for holding the magnetic assembly and mostly used to turn the magnetic circuit on and off. The holding force of this 1.2" dia×0.8" thick Neodymium magnet inside it's assembly pull tested on a 0.250" thick sheet FHS steel is about 97 Lbs. (43998.5 grams). The weight of the magnet material used is 0.2425 Lbs. (110 grams). In another case this same assembly pull tested a 0.020" thick sheet FHS in only 16 lbs. (7257.5 grams). The ratio is 400 grams pull per gram of material on a FHS 0.250" thick and 66 grams pull per gram of material on 0.020" thick FHS. But, when we optimize the magnetic assembly for holding by making the diameter of the magnet material 6 to 10 times the thickness the grams of pull force per gram of material increases greatly. 1.7" diameter×0.4" Neodymium magnet in a steel round base cup 0.060" thick steel×2" diameter on a 0.020" thk FHS pull test is 50 Lbs. and 155 Lbs. on 0.250" thick FHS. The ratio of SEE FIG. 3 Chart waiting for sample magnet and cup to test 3452310 June 1969 Israelson
4542890 September 1985 Braillon
   4616796 October 1986 Inoue
   480272 February 1989 Bownds
2003/0146633 August 2003 Jung
2004/0239460 December 2004
Kocijan Prior art magnet release devices holding US Patents (listed above) suffer from the following deficiencies:

1) Internal magnet releases are an inefficient use of the magnet material. Additional magnet material is being used to release the magnetic assembly by creating a magnetic short circuit. The magnet material cost is higher to achieve the same holding force as a magnetic assembly without a release;
2) Internal magnet releases are an inefficient use of magnet material. The magnet material is positioned away from the FHS in order to perform the switching operation. This distance creates magnetic loses. The magnet material cost is higher to achieve the same holding force as a magnetic assembly without a release;
3) Internal magnet releases are an inefficient use of magnet material. The magnet material is inside a housing that causes distance from the FHS. The magnet material cost is higher to achieve the same holding force as a magnetic without a release;
4) Internal magnet releases are an inefficient use of magnet material. The mechanism by which the magnet was moved internally causes distance from FHS when it is in the on position. The magnet material cost is higher to achieve the same holding force as a magnetic assembly without a release;
5) Internal magnet releases are accomplished by using additional ferromagnetic and non-magnetic parts;
6) Internal magnet releases are difficult to visually tell if the magnet is ready to hold "on" or in release state "off";
7) Magnet release tools require additional parts or materials to separate the magnet from the FHS, hold the magnet in off position and keep the magnet release tool from accidentally moving back to the on position.
8) External magnet release leverage cams and handles are attached. These may catch on objects or persons passing by and be release accidentally;
9) External magnet release leverage tools and handles are attached. These may be easily operated by vandals or thieves to remove the load attached to the magnet;
10) External magnet release lever arms or rotational axis handle pass through into the magnets internal workings allowing chemicals, moisture, debris and oxidation, at some added cost, a seal is often needed around the lever and handle entry point;

11) External magnet releases leverage tools fight against the magnet or do not take advantage of the magnets own attraction to pull the lever into the release (off) position.
12) External magnet releases leverage tools and their handles do not take advantage of the magnets own attraction to hold the magnet release device safely in the release (off) position.
13) External release leverage handle rises above the surface plain of the magnet's non-magnetically holding side making it difficult to mount cargo on the magnet's non-magnetically holding side.
14) Internal magnet release leverage required to move the magnet material away from the FHS is greater than external magnet release leverage required to move one edge of the magnetic assembly away from the FHS.
15) External magnet release prying tools, clamps or vise grips cannot reach between the magnetic assembly cargo load and the FHS. Either the cargo must be removed from the magnetic assembly or the cargo must be used as the lever to pull the magnetic assembly off of the FHS causing damage to the surface coating of both magnetic assembly and FHS;
16) Magnets and magnetic assemblies that hold over 30 pounds attract at such a high rate of speed and power that they have the inherent risk of causing damage to fingers, the FHS, and/or said magnets and magnetic assemblies themselves.
17) External magnet release prying tools, clamps or vise grips cause scratches to the surface finish of the magnet and the FHS
18) Leverage can only be applied from one side of the magnetic assembly. That side cannot be used for mounting cargo or near a wall.
19) Prior art internal mechanism release magnetic assemblies are good to work on thick steel ferromagnetic holding surfaces. When the magnet incorporated in this design is attached to a thin piece of steel, like a file cabinet or refrigerator, there is no need for an off switch because there is not enough steel to conduct the magnetism available from the device's thick steel pole plates. All the magnetism and the thick steel of the device are wasted on a thin piece of steel like a refrigerator or file cabinet.

SUMMARY

In accordance with the present invention a magnet release comprises a lever with: a method to pivot a lever arm on a magnet, a cam, a leverage tool temporary connection point and a magnetic contact area which will be attracted to the magnet during operation.

Objects and Advantages

Accordingly, besides the objects and advantages of the magnet release described in my above patent, several objects and advantages of the present invention are:
1) to provide a magnet release which is external to the permanent magnetic assembly, negating the need for additional magnet material to create a magnetic short circuit, optimizing the shortest distance in the magnetic circuit of the permanent magnetic assembly and the FHS or another permanent magnetic assembly.
2) to provide a magnet release which is external to the magnetic assembly allowing the magnet material to be positioned as close as possible to the FHS or another permanent magnet assembly, in the optimum magnetic circuit of a holding magnetic assembly;
3) To provide a magnet release which is external to the magnetic assembly, which does not require the magnet to be inside a housing that creates distance between the magnet material and the FHS, in the optimum magnetic circuit of a holding magnet;
4) To provide a magnet release which is an external mechanism being non-corruptive of the magnetic circuit by which the magnet material maintains the closest position to the FHS possible, in the optimum magnetic circuit of a holding magnet;
5) To provide a magnet release of the magnet or magnetic assembly with fewer parts.
6) To provide a magnet release which is external which is clearly visibly on or clearly visibly off.
7) To provide a magnet release with the additional purpose of using the existing lever arm part for the additional purposes: 1) to separate the magnet from the ferromagnetic holding surface, 2) the off position fulcrum of the hinge barrel being aligned off center of the contact point of the lever arm wheel to force the lever arm towards the off position as the magnetic assembly is pulled towards a ferromagnetic holding surface, 3) to make contact with the magnet to be held magnetically from swinging to the on position accidentally.
8) To provide a magnet release in which the leverage handle is easily removable and the hinge flanges are low profile to avoid accidentally be released by someone or something passing by.
9) To provide a magnet release with removable leverage tool, which when removed makes it difficult to operated by vandals or thieves to remove the load attached to the magnet;
10) To provide a magnet release which is external from the magnet with no need for a lever arm pass through or rotational arm pass through into the magnets internal workings, which allows chemicals, moisture, debris and oxidation, a seal is need not be created around the lever and handle entry point into the magnet.
11) To provide a magnet release in which the leverage works toward the magnetic pull of the magnet and does take advantage of the magnetic pull to assist in moving the lever into the release (off) position.
12) To provide a magnet release which takes advantage of the magnets own attraction to hold the magnet release lever safely in the (off) position.
13) To provide a magnet release which does not extend past the surface plain of the magnetic assembly's magnetically holding face while the magnetic release is in the on position, the magnet release also does not extend past the surface plain of the magnetic assembly's non-magnetic holding face; the face opposite the holding face while in the off position, therefore cargo mounted to the magnetic assembly's non-magnetic holding face with a surface shape that is mostly flat will not hinder the magnet release motion.
14) To provide a magnet release, external from the magnetic assembly and housing, where there is less leverage required to move one edge of the magnetic assembly away from the FHS than to remove two or more edges at the same time.
15) To provide a magnet release being external from the magnetic assembly, not requiring removal of the cargo load attached to the magnetic assembly to operate the leverage tool in the leverage tool port and avoids damage to the cargo, the magnetic assembly and the FHS surface coatings.

16) To provide a magnet release with the additional purpose of controlling the rate of attractive motion of the magnetic assembly to avoid damage of fingers, magnets or FHS coatings being damaged.
17) To provide a magnet release that will avoid damage to the magnet coating surface or the FHS coating surface.
18) To provide a device leverage tool ports that are accessible from two sides in case something is blocking one side. If for example cargo or the ferromagnetic holding surface (FHS) or a wall is blocking one side then the other side may be used to access and actuate the magnet release.
20) To provide an external mechanism magnet release which allows the magnet and steel assembly to be designed specifically for a thin ferromagnetic holding surface (FHS) On a thin steel FHS like a file cabinet, tool chest or refrigerator the magnet and steel are efficiently designed close to the FHS. Then the mechanism to release magnetic assemblies is attached to the periphery or somewhere to not make the magnetic design thicker than needed.

Further objects and advantages are to provide a magnet release which is made simply, affixed simply to a magnet and operated simply to separate a magnet from a FHS or another magnet, 1 requiring no magnet material in itself, 2 will be affixed to the already optimal dimensioned magnet, allowing the best use of magnet material for holding force, 3 may also be affixed to the optimized housing of a magnetic assembly allowing the optimal use of magnet material and housing material for holding force, 4 which is non-interfering with the magnetic circuit distance from the ferromagnetic holding surface, 5 with few parts, 6 which is clearly visibly on of off, 7 To provide a magnet release with the additional purpose of using the existing lever arm part for the multiple purposes: 1) to separate the magnet from the ferromagnetic holding surface, 2) to make contact with the magnet to be held magnetically from swinging to the on position accidentally, 3) the off position fulcrum of the hinge barrel being aligned off center of the contact point of the lever arm wheel to force the lever arm towards the off position as the magnetic assembly is pulled towards a ferromagnetic holding surface 8 with a removable leverage tool to avoid accidental use or theft, 10 which requires no seal on the magnet or magnetic assembly, 11 which magnetically pulls the lever towards the magnet, 12 which is held in the off position by the magnetic pull of the existing magnet, 13 which operates in a small footprint not hindered by the cargo or FHS, 14 which removes one edge of the magnet first before removing the whole magnet requiring less initial torque, 15 in which the cargo remains affixed during the release of the magnet. 16 To provide a magnet release with the additional purpose of controlling the rate of attractive motion of the magnetic assembly to avoid damage to fingers, magnets, or FHS, 17 which will be protective of the FHS surface finish or other magnets surface finish. To provide a lever base which is accessible from at least one side with the ability to be accessed from two 180 degree sides.

BRIEF DESCRIPTION OF THE DRAWINGS

Preferred form of the present invention will now be illustrated. The following figures are not all inclusive of possible embodiments of the invention. Closely related figures will have the same number but may have different alphabetic suffixes.

FIG. 5A to 5B Shows an cross sectional expanded view of an embodiment of a magnet release typical of the present invention with threaded fastening and a wheel.

FIG. 9A and FIG. 9B Shows a cross sectional expanded view of an alternate embodiment, of this present invention a magnet release, with no wheel, with a removable lever arm cam.

FIG. 11A to FIG. 11F Shows a cross sectional view of an alternate embodiment, of this present invention a magnet release, with no wheel, with a removable lever arm cam, hooking from the bottom to and external hinge post.

FIG. 15A to FIG. 15D Show a cross sectional expanded view of a preferred embodiment with short lever arm with a wheel and a lever on the side opposite to the magnet release.

FIG. 16A to FIG. 16D Show a cross sectional expanded view of a preferred embodiment with short lever arm with a cam and a lever on the side opposite to the magnet release.

FIG. 18A to FIG. 18B Show a cross sectional view of an alternate embodiment with a large wheel and a small magnetic contact area on vertical surface.

FIG. 21A to FIG. 21B Show a cross sectional view of a preferred embodiment with cam lever arm with no wheel.

REFERENCE NUMERALS IN THE DRAWINGS

Figure 1:
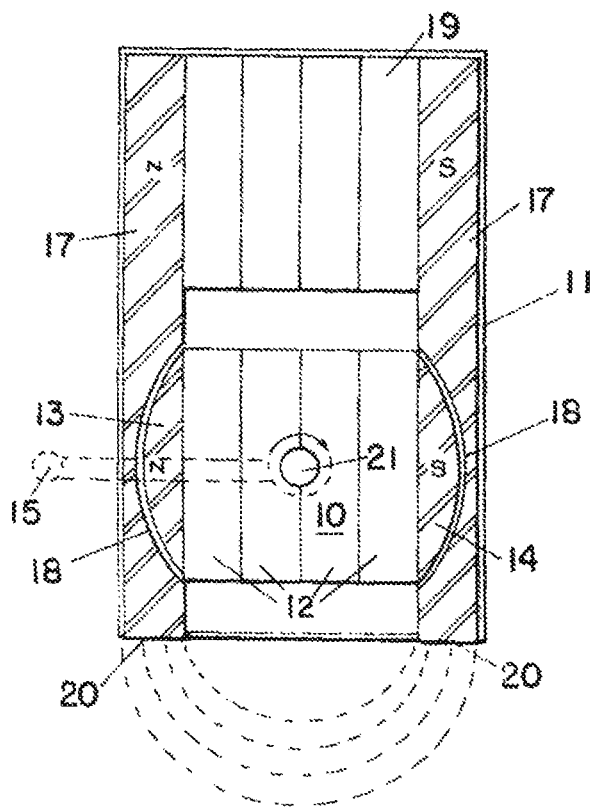
FIG. 1 Israelson U.S. Pat. No. 3,452,310. The view is cross sectional of prior art.

10 attachment plate
11 hinge barrel
12 hex bushing A
13 hinge post
14 hex bushing B
15 lever arm A
16 lever arm B
17 lever wheel
18 lever wheel axel
19 c clip A
20 c clip B
21 Cargo
22 Magnetic Assembly
23 ferromagnetic holding surface FHS
24 "J" lever
25 magnetic contact area
26 leverage tool port
27 end support A
28 end support B
29 initial torque lever contact area
30 lever hinge barrel axel tool port
31 center line of fulcrum
32 center line of lever force against 23 FHS
33 initial torque ramp
34 flat of cam
35 belt
36 cargo bolt
37 leverage bolt
38 angle support for bolt
39 ball/oval sphere
40 lever wheel close
41 lever wheel axel close
42 leverage tool example
43 lever

DETAILED DESCRIPTION OF THE DRAWINGS

The attached figures are intended for illustration of preferred embodiments of this present invention. While there are many possible embodiments of this invention for brevity sake only the main ideas are conveyed. The present invention should not be thought of as limited to only these attached figures.

This present invention was designed and tested for many uses with magnets and magnetic products like: magnetic holding devices, magnetic lifting devices, magnetic sweepers, magnetic assemblies, magnet to magnet couplings, etc. It is limited to magnets and magnetic products that are mostly rigid. It will not work on products that are mostly flexible. Otherwise, it may be used on all magnets and magnetic products to release from and attach to a mostly rigid ferromagnetic holding surfaces or mostly rigid magnets or mostly rigid magnetic products.

FIG. 1 Prior art is shown from Israelson U.S. Pat. No. 3,452,310 FIGS. 1 and 2

Figure 2:
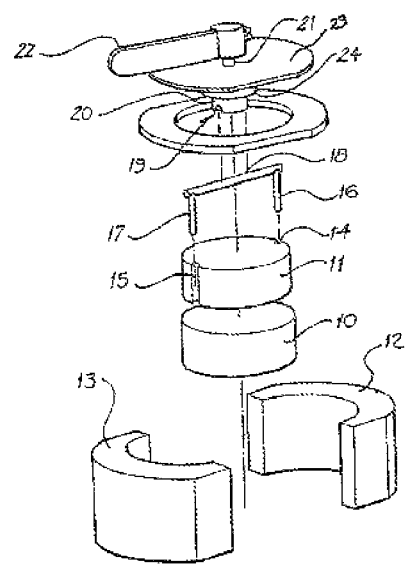
FIG. 2 Kocijan Pat. Application #US2004/0239460 A1. The view is expanded 3 dimensional of prior art FIG. 3A to FIG. 3B Is a chart and a graph of Magnetic Assemblies Grams Holding Force Per Grams Of Magnet Material Used. This is a view of the invention performance contrasted with prior art Kocijan in the form of a data chart and a graph.
Figure 3A:
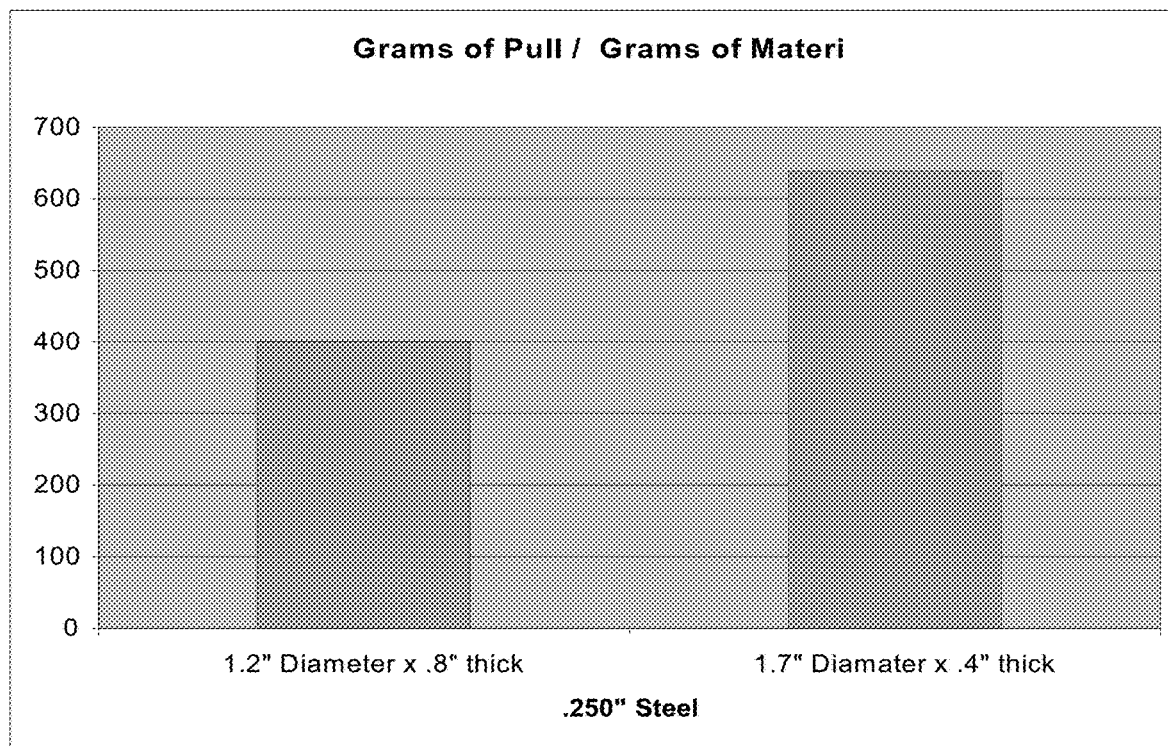

FIG. 2 Prior art is shown from Kocijan Pat. Application #US2004/0239460 A1 FIG. 5a FIG. 3A Shows a chart and graph of Magnetic Assembly Grams Holding Force Per Grams Of Magnet Material Used. This test was done on 0.250" FHS. Magnet Materials tested were NdFeB, Ceramic and SmCo. This chart is a summary of test results conducted to measure the relationship between the amount of magnet material used and the holding force for two general shapes of magnets. The first shape having a thickness, measured perpendicularly away from said (FHS), that is greater than one-eighteenth ($\frac{1}{18}^{th}$) of the periphery (circumference) of said magnet. This shape I will call the "Thick" shape magnet. The second magnet shape having a thickness less than one-eighteenth ($\frac{1}{18}$th) of the periphery (circumference) of the magnet. This magnet shape I will call the "Thin" type. Both shapes have a holding surface, by which they will be magnetically attached to a Ferromagnetic Holding Surface (FHS). The chart can be summarized as follows: A "Thick" shape magnet holds less grams per gram of magnet material than a "Thin" shape magnet. The closer the magnet material mass can be to the holding surface the more holding strength per gram of magnet material used. Therefore, a magnet release device that increases the magnet material's distance from the FHS during the attached ("on") position, is less efficient use of magnet material than a magnet release device that allows the magnet material to be as close to the FHS as possible. This present invention is outside of the magnet or magnetic assembly which is optimized for use of magnet material; the magnet material is allowed to be as close to the FHS as possible.

In addition to a waste of magnet material; the leverage mechanism in many prior art devices is complicated which causes power losses due to greater friction and indirect linkages. The leverage of my device is also applied directly so that there is no loss of power due to power transfer mechanisms.

Figure 3B:
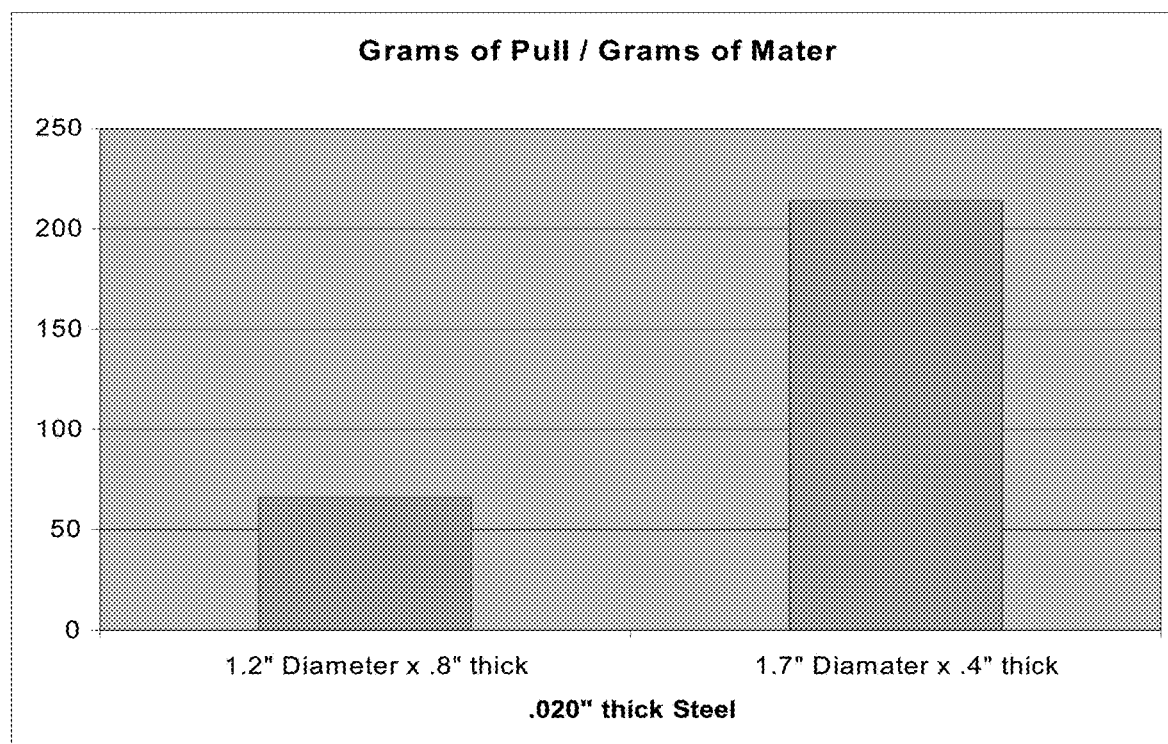

FIG. 3B Shows a chart and graph of Magnetic Assembly Grams Holding Force Per Grams Of Magnet Material Used. This test was done on 0.250" FHS. The losses due to a thicker magnet are not as dramatic as on the thin steel (0.020"). However, they are still 63% (250/400=63%). In conclusion, all other things being constant, the further the magnet raw material mass is away from the ferromagnetic holding surface the weaker the assembly.

Figure 4A:
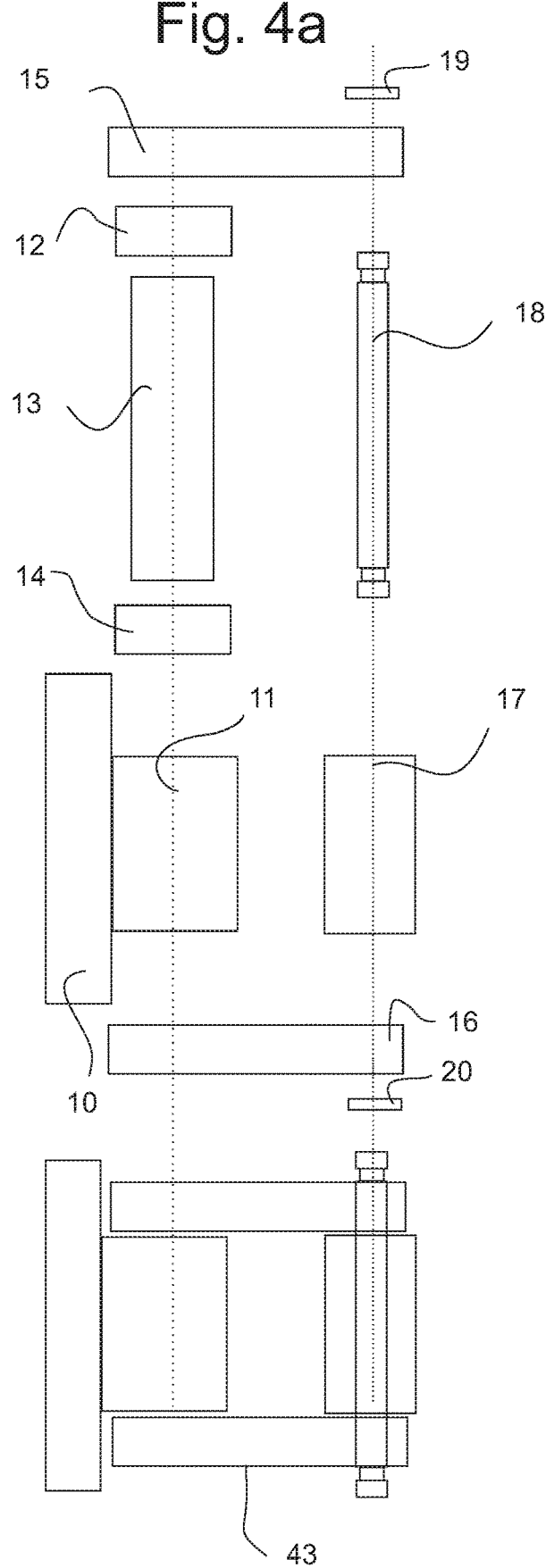
FIG. 4A to 4B Shows an cross sectional expanded view of an embodiment of a magnet release of the present invention with additional parts including a wheel.

FIG. 4A Is showing an expanded top view of a magnet release typical embodiment of the present invention to be affixed to a magnet or magnetic product with adhesive or welding or other mechanical means, at the attachment plate 10, affixed to attachment plate 10 is the hinge barrel 11 with hinge post 13 inserted inside so that it can rotate within 11, then affixed to the ends of hinge post 13 is a hex bushing A 12 (or the ends can simply be machined to a hex shape) on one end and hex bushing B 14 on the other end, a lever arm A 15 is affixed to hex busing A 12 and lever arm B 16 is affixed to hex bushing B 14, then lever wheel axel 18 is inserted through lever arm A 15, the lever wheel axel 18 at the end of lever arm 15 and lever arm 16 is then held from moving axially by "C" clip A 19 and "C" clip B 20, a leverage tool port 26 through the center of hinge post 13 can be accessed from either side by inserting a leverage tool example 42 like a hex wrench (hex wrench not shown), when leverage tool example 42 is rotated the lever wheel 17 presses the FHS 23 away from the magnetic assembly 22, after separation of the magnetic assembly 22 from the FHS 23 the lever arm A 15 and lever arm B 16 are magnetically held to the magnetic assembly 22 using the magnetic contact area 25. At the bottom of the FIG. 4a is the assembled view from the top.

The lever wheel 17 and lever wheel axel 18 at the end of the lever arm A 15 and lever arm B 16 is an added part to the preferred embodiment. It serves two purposes; it protects said FHS from scratches and reduces friction between the lever arm B 16 and/or lever arm A 15 and the FHS 23. Secondly, this reduces the required turning force. The wheel can be replaced by various methods to reduce friction and decrease scratching damage to the FHS: a belt, a casing, multiple wheels, liquid lubricants, a piece of paper, cloth, plastics, wax, graphite, the foreskin of a Philistine, etc.

The leverage tool port(s) 26 may be replaced with a bolt head that extends out, crosshead screwdriver holes, flathead screwdriver holes (slots) or star head driver holes as needed. The holes can also be mixed if need be so that one side has a hex driver hole and the other side has a crosshead driver hole. Note that this device leverage tool port(s) 26 are accessible from two sides in case something is blocking one side. If for example cargo 21 or the FHS 23 or a wall is blocking one side then the other side may be used to access and actuate the magnet release. Lever 43 is a combination of all parts in FIG. 4a.

Figure 4B:
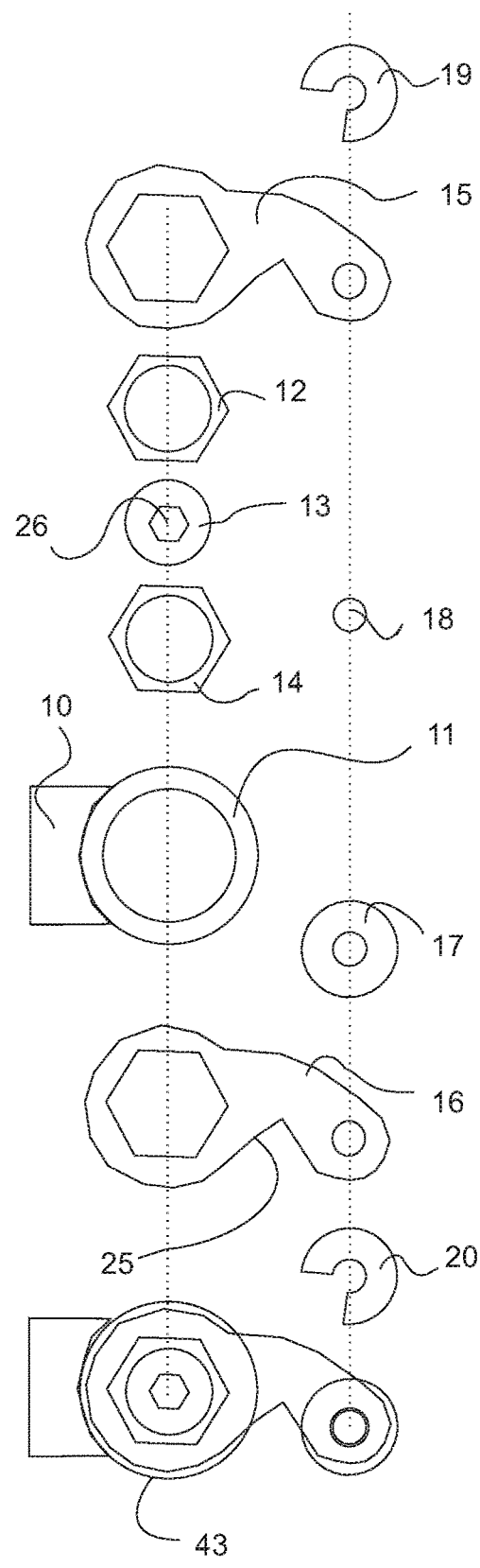

FIG. 4B Shows an expanded side view of FIG. 4A

FIG. 5A to 5B Shows an expanded view of one embodiment of a magnet release of the present invention, this embodiment has more parts than necessary, the hex bushing A 12 and the hex bushing B 14 are replaced by threaded nuts and the hinge post 13 is threaded on the two ends, hex bushing A 12 and the hex bushing B 14 are permanently affixed to both the hinge post 13 and the lever arm A 15 and lever arm B 16.

Figure 6:
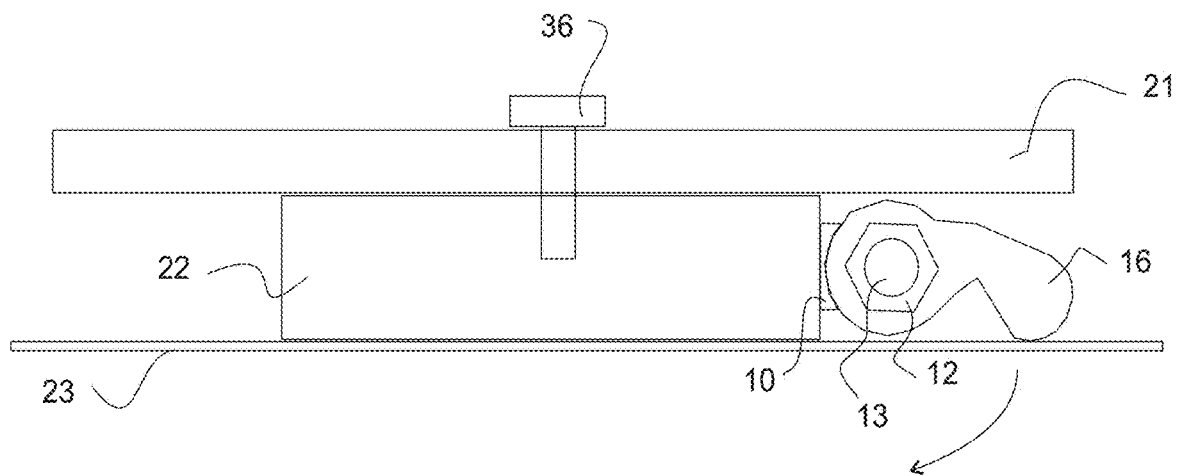
FIG. 6 Shows a cross sectional view of the preferred embodiment, of this present invention a magnet release in the magnet on position FIG. 7 Shows a cross sectional view of the preferred embodiment, of this present invention a magnet release in the magnet off position FIG. 8A to FIG. 8C Shows a cross sectional view of a typical embodiment, of this present invention, a magnet release with a wheel, being held in the on position, partially on and off magnet positions, with a magnetic assembly, a cargo and a Ferromagnetic Holding Surface (FHS).

FIG. 6 Shows a cross sectional view of an embodiment, of this present invention from FIG. 4 attached by the attachment plate 10 to a magnetic assembly 22, the magnet release being held in the on position between said Ferromagnetic Holding Surface (FHS) 23 and a cargo 21, cargo is held to magnet by a cargo bolt 36.

Figure 7:
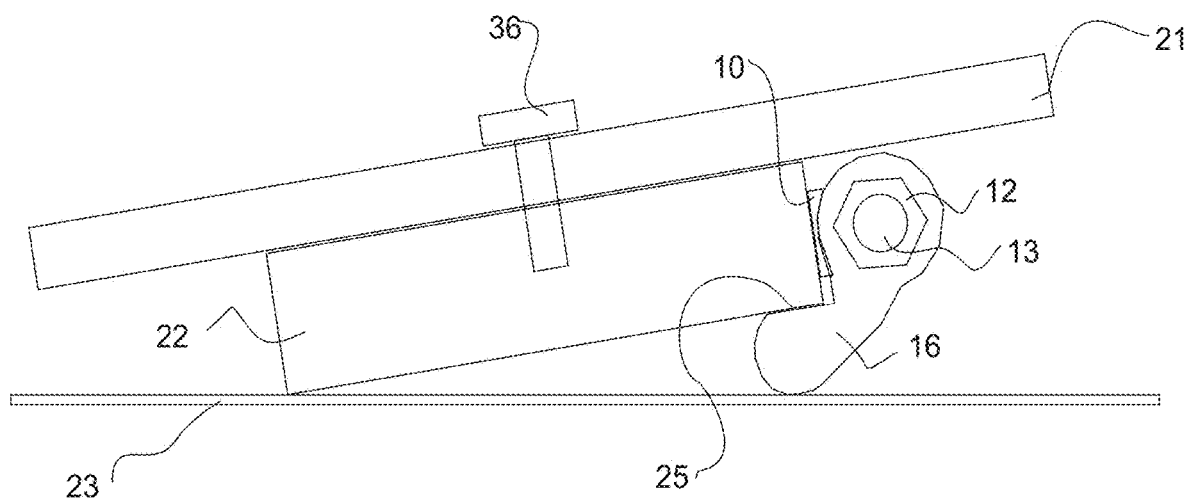

FIG. 7 The embodiment of FIG. 6 with lever arm A 15 and lever arm B 16 rotated about 210 degrees causing the magnetic assembly 22 to be released magnetically from Ferromagnetic Holding Surface (FHS) 23. Lever arm 15 and lever arm 16 are held magnetically to the magnetic assembly 22 by the magnetic contact area 25.

Figure 8A:
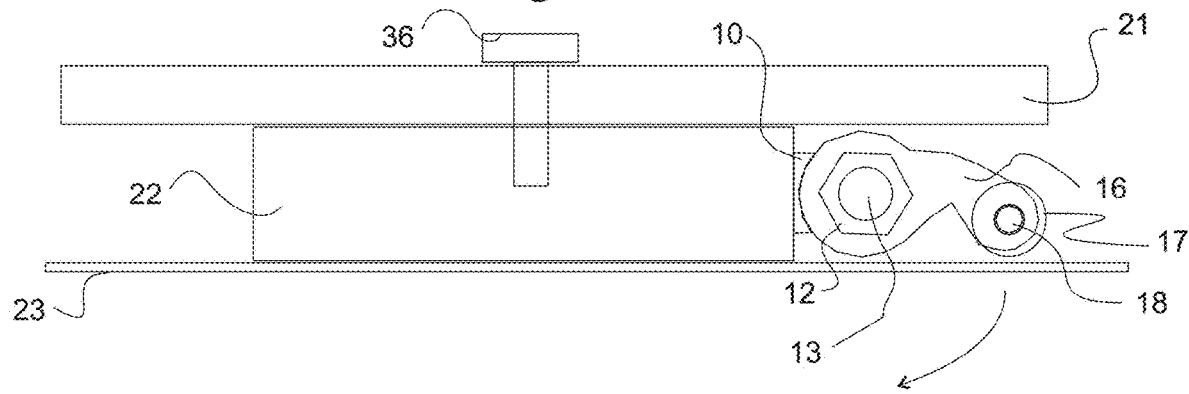

FIG. 8A Shows the cross sectional view of a typical embodiment with a lever wheel 17 and lever wheel axel 18 added to reduce friction and protect the FHS 23 surface finish.

Figure 8B:
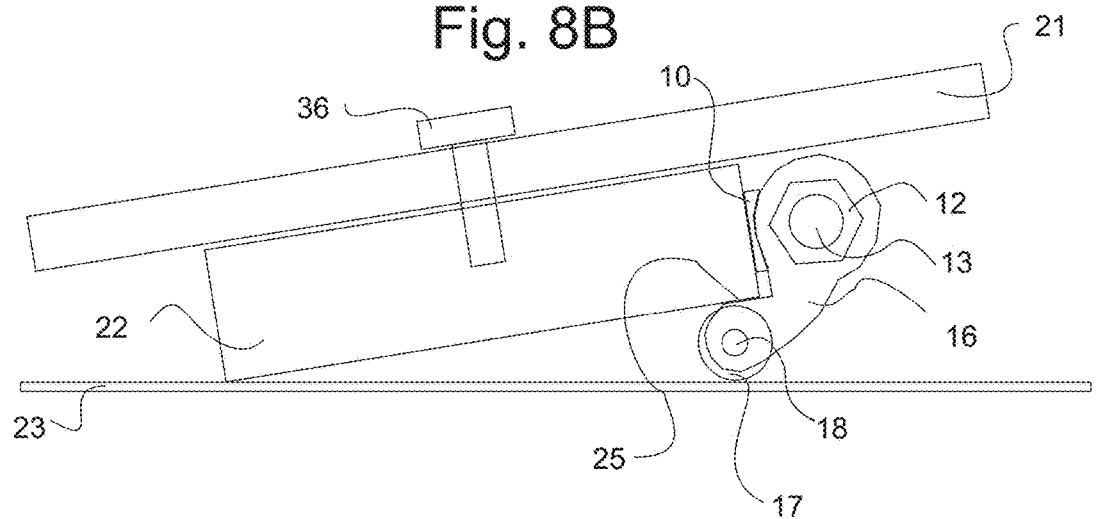

FIG. 8B Shows the cross sectional view of a typical embodiment with lever arm 16, being held magnetically in the off position by contact with a magnetic assembly 22 at the magnetic contact area 25 of the lever arm A 15 and lever arm B 16. magnetic assembly 22 is sufficiently separated from Ferromagnetic Holding Surface (FHS) 23 to be removed easily by hand.

Figure 8C:
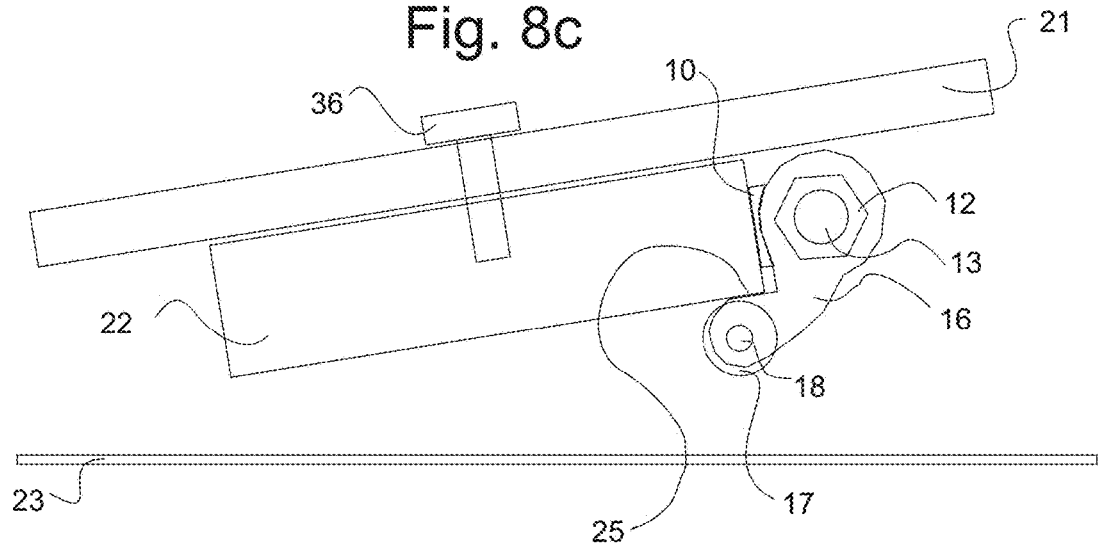
Figure 10A:
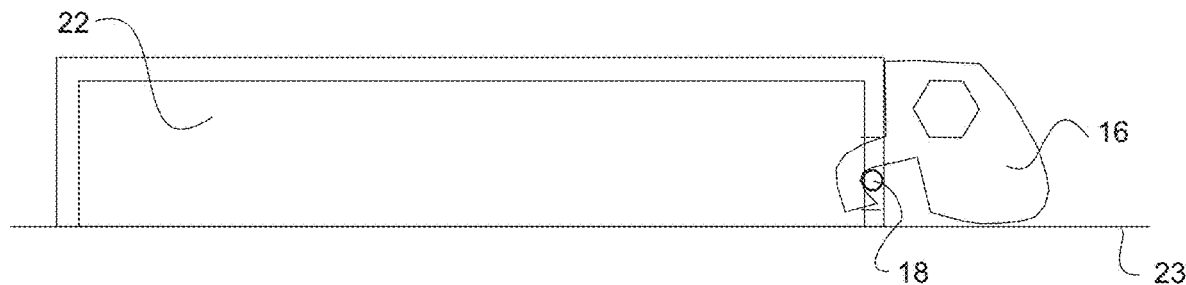
FIG. 10 Shows a cross sectional view of an alternate embodiment, of this present invention a magnet release, with no wheel, with a removable lever arm cam, hooking from the top through the magnetic assembly wall.
Figure 10B:
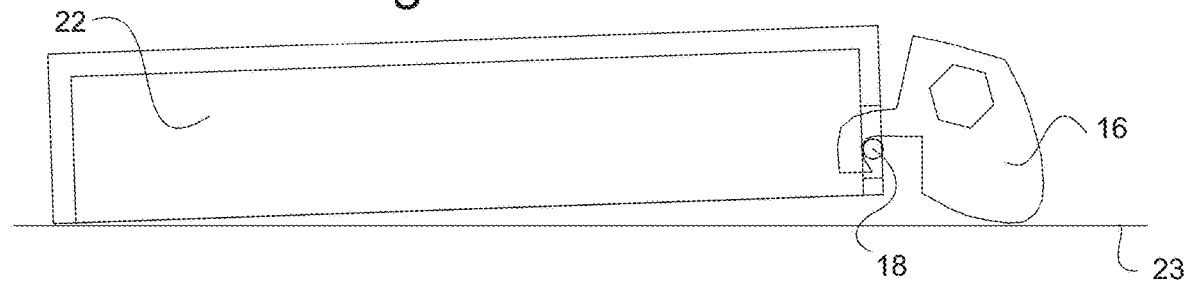
Figure 10C:
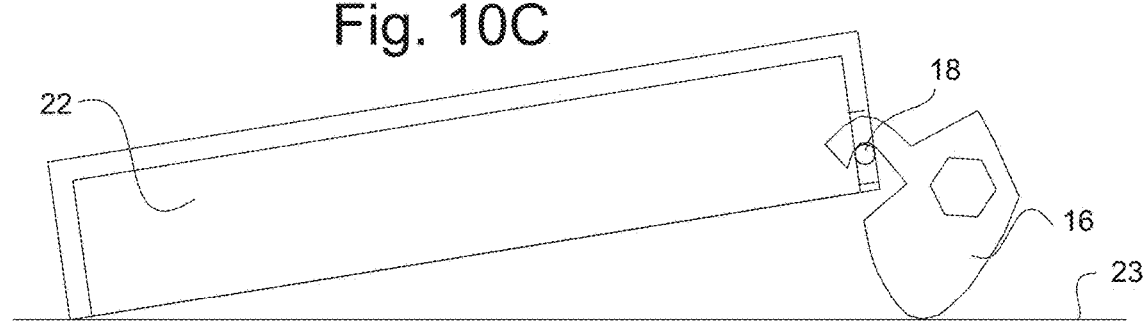
Figure 10D:

FIG. 8C Shows the cross sectional view of a typical embodiment with the magnetic assembly 22 completely separated from the FHS 23. The lever arm A 15 and lever arm B 16 are held at the magnetic contact area 25 by magnetic attraction to the magnetic assembly 22.

FIG. 9A Shows an expanded top view and assembled top view of the preferred embodiment which requires fewest parts of my other embodiments.

FIG. 9B Shows an expanded side view.

FIG. 10A to 10D Shows a cross sectional view of the less desirable embodiment, of this present invention. A magnet release, having the attachment plate 10 replaced by a hook, thereby replacing the need for the magnet release to be permanently attached to the magnetic assembly 22, the hook being used through the steel wall of a magnetic assembly, showing 4 steps of rotation: first the on position in FIG. 10a, then the separation position FIG. 10b, then the fully lifted position in FIG. 10c, then magnet release being held magnetically in the off position by contact with a magnetic assembly in FIG. 10d.

FIG. 11A to 11E Shows a cross sectional view of the preferred embodiment of the present invention, with a transparent view of a leverage tool example 42. FIG. 11a shows leverage tool example 42 not in the leverage tool port 26, the attachment plate 10 is replaced by a hinge post 13 affixed to a magnetic assembly 22 then the hinge barrel 11 being made half a barrel as an integral part of the lever arm B 16 which is able to hook under the hinge post 13. Shown in FIG. 11b. is leverage tool example 42 inserted in the leverage tool port 26, a magnetic assembly 22 with cargo 21 affixed to the top side, the hinge post 13 being used outside the periphery of the magnetic assembly 22 between the cargo 21 and the FHS 23 during the on position, lever arm B 16 being rotated by leverage tool example 26 (a hex wrench) in the hex leverage tool port 26 to separate the magnetic assembly 22 from the FHS 23. In FIG. 11c, leverage tool example 42 is rotated about 30 degrees, then the device leverage arm 16 cam separates the magnetic assembly 22 from the FHS 23. FIG. 11d Shows leverage tool example 42 is rotated about 60 degrees, magnet lever arm B 16 rotates closer to magnetic assembly 22 while making greater separation. FIG. 11e Shows leverage tool example 42 rotated about 90 degrees, lever arm B 16 is being held magnetically in the off position by the magnetic contact area 25 in contact with the magnetic assembly 22. FIG. 11f Shows leverage tool example 42 is removed from the leverage tool port 26, the magnetic assembly 22 is removed from the FHS 23 with lever arm B 16 is held in the off position magnetically. The magnet can then be placed safely on another 23 FHS and the process reversed to gradually, safely to connect the magnetic assembly 22 magnetically with the new FHS.

Figure 12A:
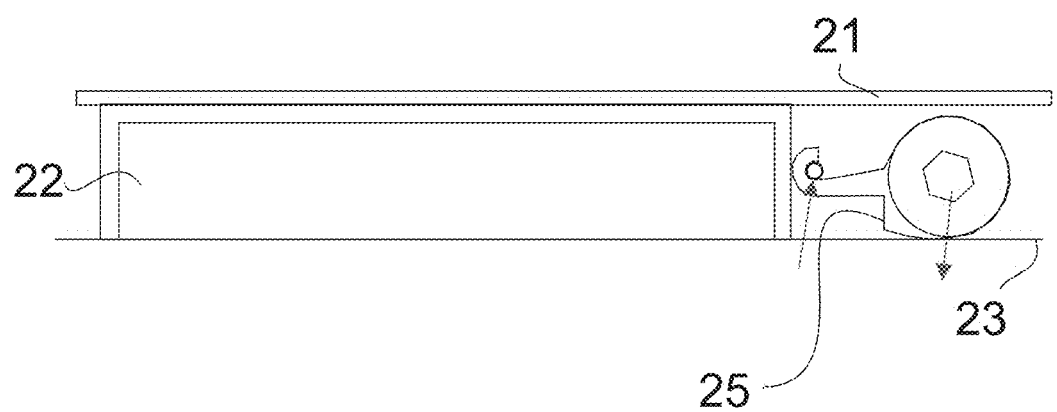
FIG. 12A to FIG. 12B Shows a cross sectional view of a less effective embodiment, of this present invention a magnet release, with no wheel, with a cam at the end of the lever, with a long removable lever arm, hooking from the bottom to and external hinge post.
Figure 12B:
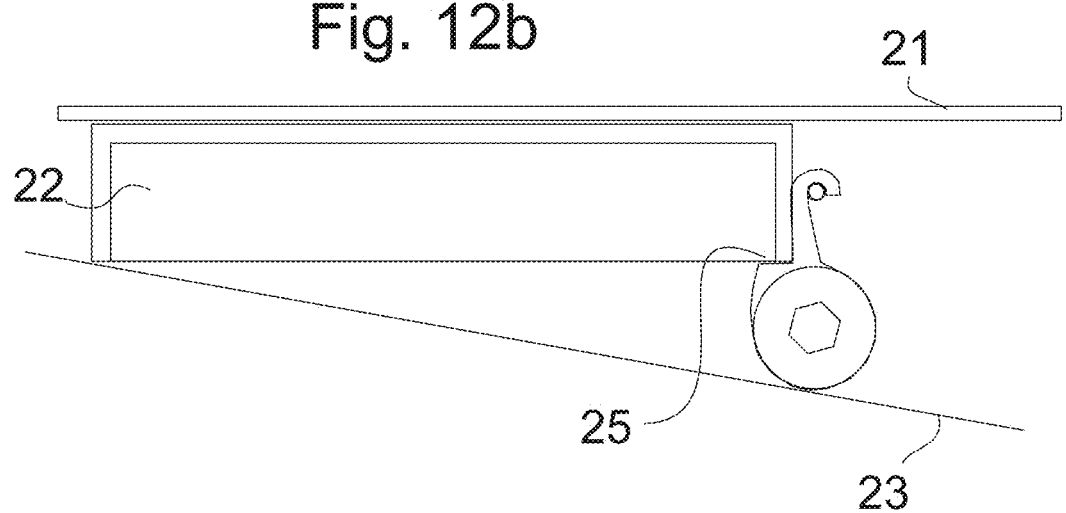

FIG. 12A to 12B Shows a cross sectional view of another embodiment in the on position and the off position, with little advantage. The lever arm 16 is long with the leverage tool port far from the magnet. The initial input torque to operate this embodiment makes it less desirable, however it does have the advantage of large separation of the magnetic assembly 22 from the FHS 23 and the it has the ability to hold the magnet release in the off position magnetically at the magnetic contact area 25

Figure 13A:
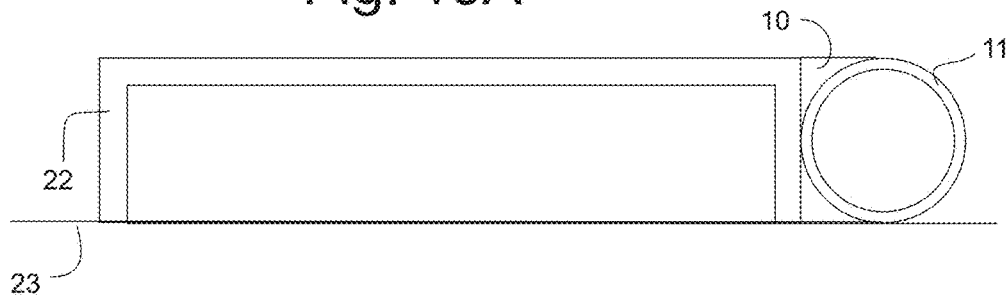
FIG. 13A to FIG. 13D Show a cross sectional view of a less effective embodiment, of this present invention a magnet release, with a wheel that is also the cam at the end of the lever, with a long lever arm, with an attached hinge post and barrel.
Figure 13B:
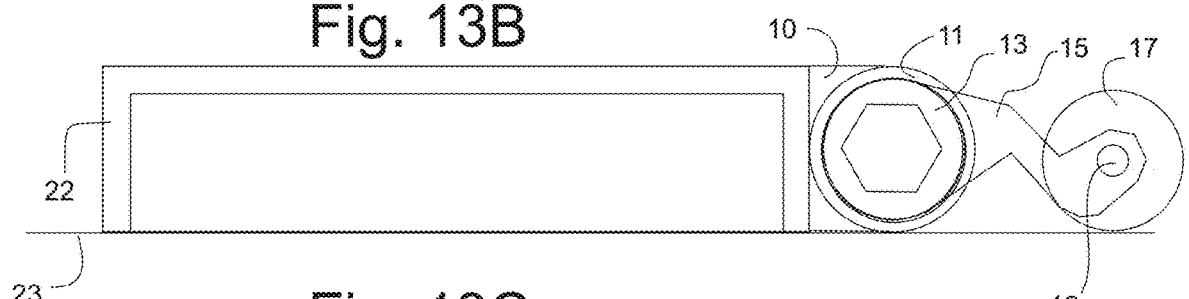
Figure 13C:
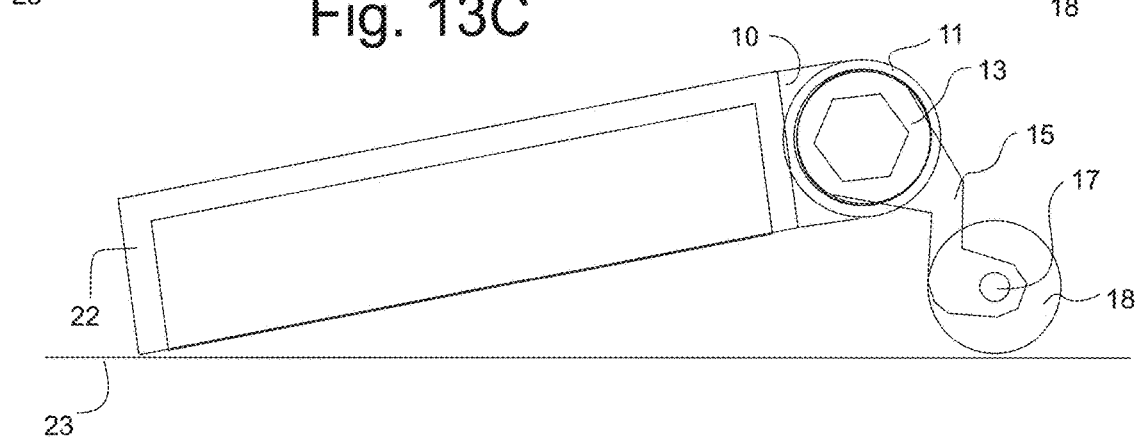
Figure 13D:
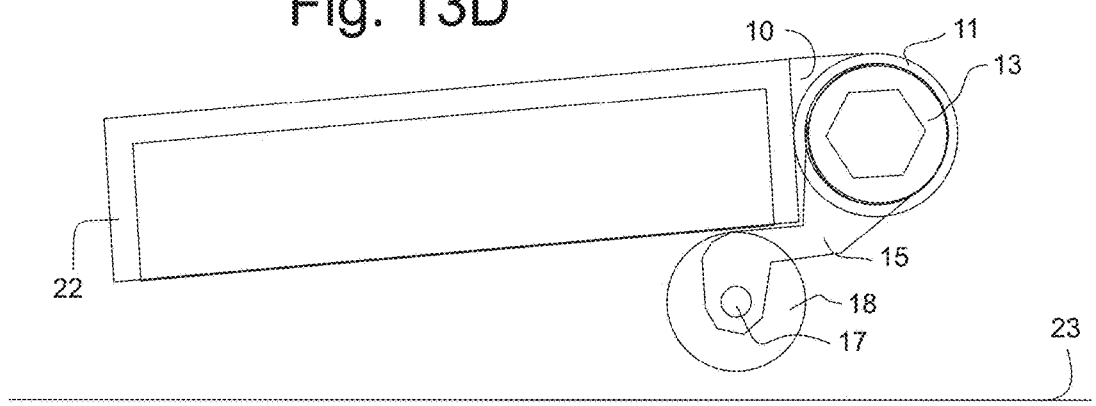
Figure 13E:
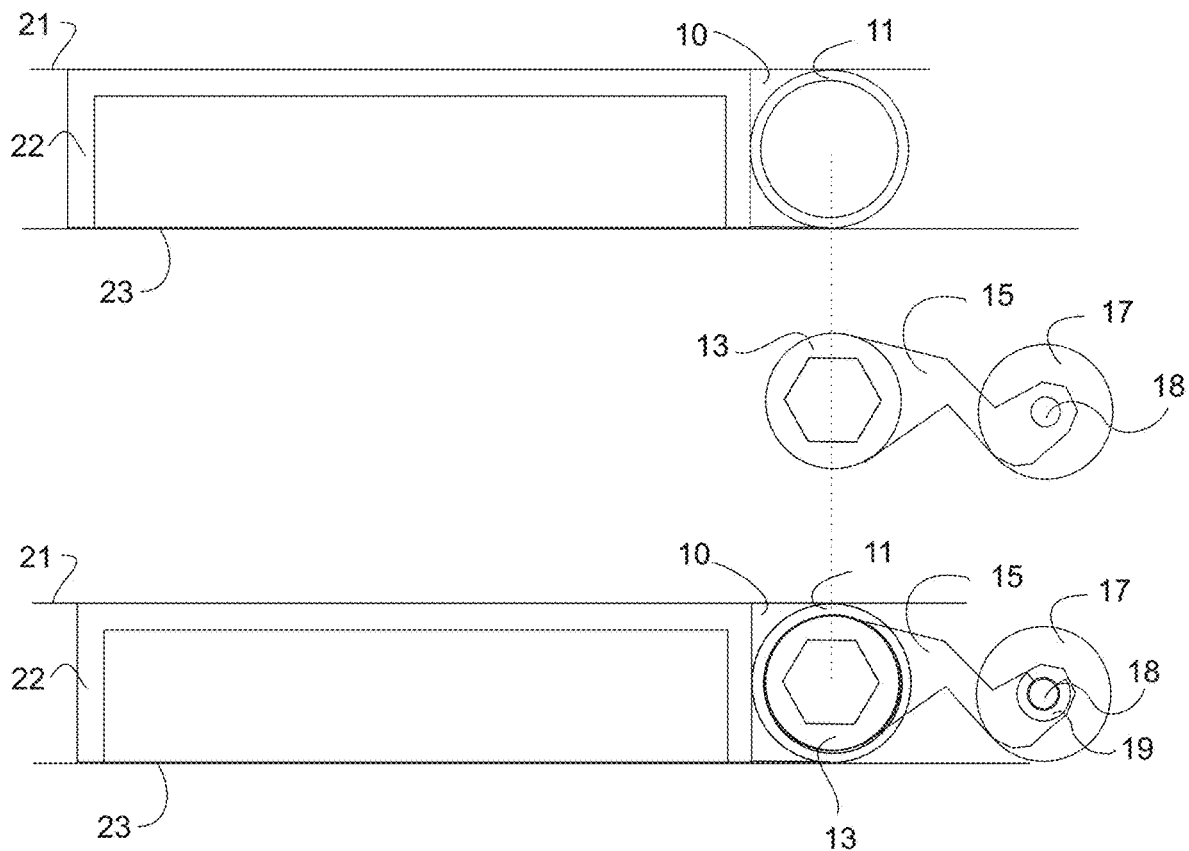
FIG. 13E to FIG. 13F Show an cross sectional expanded view of FIG. 13*a*
Figure 13F:
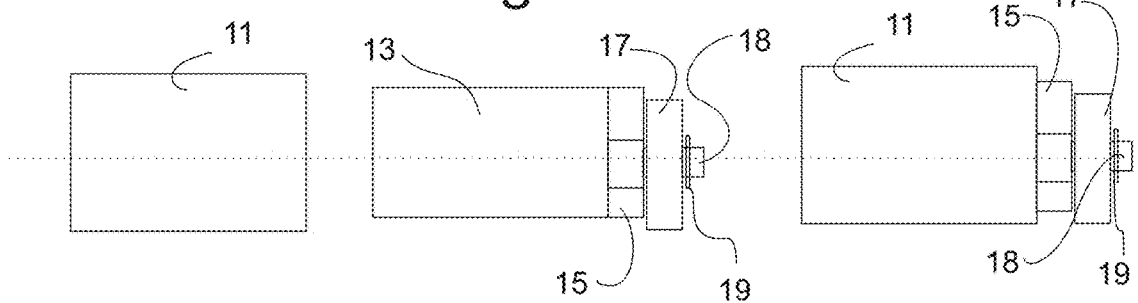

FIG. 13A to 13F Shows a cross sectional view of another embodiment of this present invention with the attachment plate 10 and the hinge barrel 11. FIG. 13*b* shows the magnet release in the on position with, hinge post 13 with leverage tool port 26, affixed to the lever arm 15, affixed to the lever wheel axel 18, affixed to the lever wheel 17 parts are inserted into the hinge barrel 11 to form the magnet release invention. FIG. 13*c* shows the magnet release partially rotated with magnetic assembly 22 separated from the FHS 23. FIG. 13*d* shows the magnet release held in the off position by attraction from the magnetic assembly 22 at the magnetic contact area 23. FIG. 13*e* shows magnetic assembly 22 affixed to attachment plate 10 affixed to hinge barrel 11, separately showing hinge post 13 with leverage tool port 26, affixed to the lever arm 15, affixed to the lever wheel axel 18, affixed to the lever wheel 17. This group of parts may be inserted into hinge barrel 11 to form the magnet release invention. This group of parts maybe removed from the hinge barrel to make it more difficult for someone to remove the magnetic assembly 22. FIG. 13*f* shows an expanded side view of hinge barrel 11, hinge post 13 affixed to the lever arm 15, affixed to the lever wheel axel 18, mounted on lever wheel 17 with c clip A 19

Figure 14A:
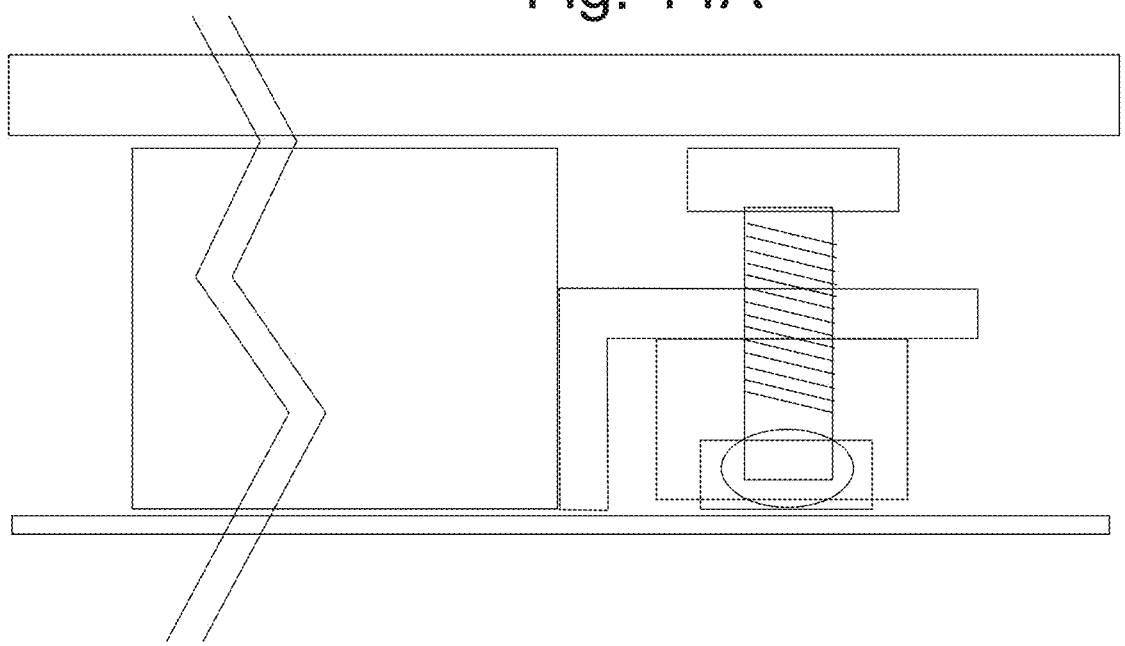
FIG. 14A shows a cross sectional view of an impossible embodiment due to the cargo blocking access to the threaded fastener.
Figure 14B:
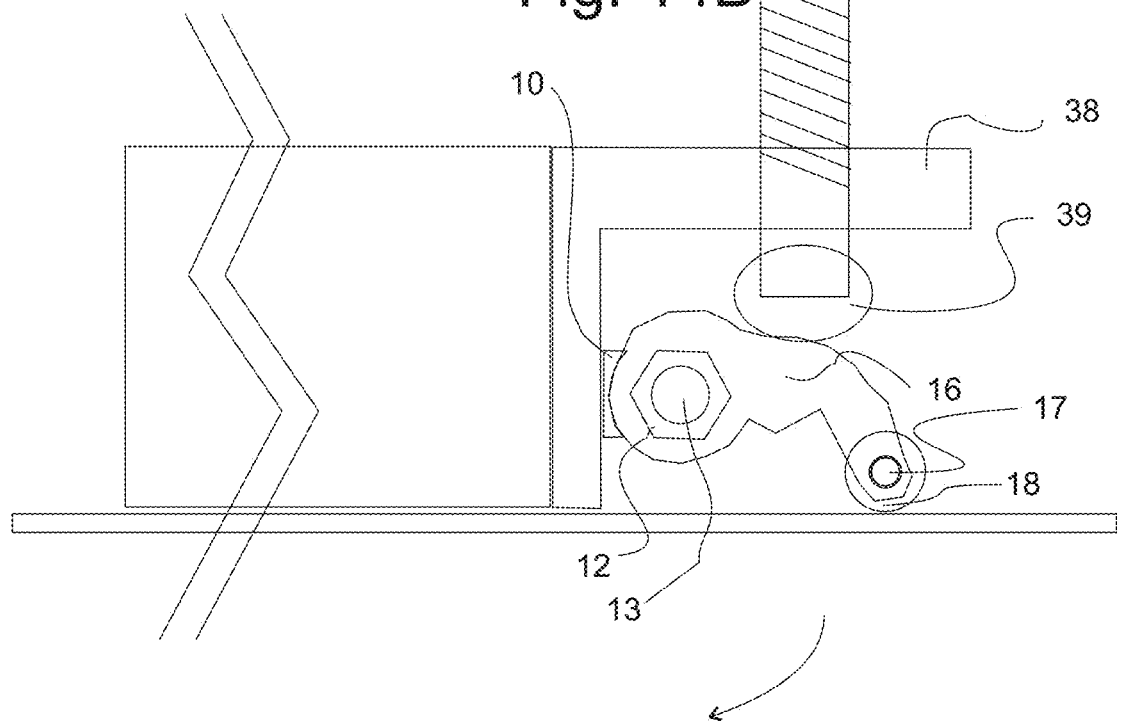
FIG. 14B shows a cross sectional view of a possible embodiment if there is no cargo in the way of the magnet release.

FIG. 14A shows a cross sectional view of an alternate embodiment with a threaded fastener for a leverage bolt 37 held in place by an angle support for bolt 38 Which is not effective due to the cargo 21 which blocks access to the leverage tool port. FIG. 14B shows a cross sectional view of an alternate embodiment with a threaded fastener for a leverage bolt 37 held in place by an angle support for bolt 38 where there is no cargo 21 blocking access to the leverage bolt 37 with a leverage tool. This is an effective form of the present invention. A ball oval sphere 39 may be affixed to the end of leverage bolt 37 for more efficient transfer of force.

FIGS. 15A and 15B show a cross sectional view of an additional preferred embodiment of this present invention, a magnet release embodiment most suited for releasing the strongest magnetic assembly 22 while:
1) using the least amount of initial torque applied to the leverage tool port 26 to separate the magnetic assembly 22 from the FHS 23 as shown in FIG. 15*b*
2) separating the magnetic assembly 22 sufficiently to remove it from the ferromagnetic holding surface 23 by hand
3) in the off position, the magnet is still pulled towards a ferromagnetic holding surface by the magnetically attached opposite side of the magnet, the contact point at the end of lever 15 is forced toward the magnet due to force from the FHS and the position of the fulcrum of hinge barrel 11
4) making the angle of the lever arm A 15 being less than 90 degrees to the FHS 23 reduces the initial torque needed to release the magnetic assembly 22 from FHS 23
5) protecting the FHS 23 coating, magnetic assembly 22 and cargo 21
6) fitting within the footprint between the FHS 23 and the cargo 21
7) however not using the least amount of parts
8) maximize the leverage tool port size within the footprint between the FHS 23 and the cargo 21

FIGS. 16A and 16B show a cross sectional view of the preferred embodiment of this present invention, a magnet release embodiment most suited for releasing the strongest magnetic assembly when the FHS 23 coating is ok to scratch 22 while:
1) using the least amount of initial torque applied to the leverage tool port 26 to separate the magnetic assembly 22 from the FHS 23 as shown in FIG. 16*b*
2) separating the magnetic assembly 22 sufficiently to remove it from the ferromagnetic holding surface 23 by hand
3) in the off position, the magnet is still pulled towards a ferromagnetic holding surface by the magnetically attached opposite side of the magnet, the contact point at the end of lever 15 is forced toward the magnet due to force from the FHS and the position of the fulcrum of hinge barrel 11
4) making contact between the magnetic assembly 22 and the magnetic contact area 25 to hold the lever arm 15 while not in use, in the off position.
5) making the angle of the lever arm A 15 being less than 90 degrees to the FHS 23 reduces the initial torque needed to release the magnetic assembly 22 from FHS 23
6) however not protecting the FHS 23 coating, magnetic assembly 22 and cargo 21
7) fitting within the footprint between the FHS 23 and the cargo 21
8) using the least amount of parts and materials
9) maximize the leverage tool port size within the footprint between the FHS 23 and the cargo 21

FIG. 16C to 16F Show end views of the lever wheel axel 18, the lever arm B 16 and the leverage tool port in four different embodiments. The preferred embodiment is the flat head screw driver FIG. 16*c* because it is the most readily available leverage tool, followed by the cross head FIG. 16*d*, the star head FIG. 16*e*, and the square head FIG. 16*f*. Many other leverage tool ports shapes 26 such a female hex (Allen bolt) or a male hex shape (standard bolt head) are also useful. Leverage tool ports are available on the device to both ends of the lever wheel axel 18.

Figure 17A:
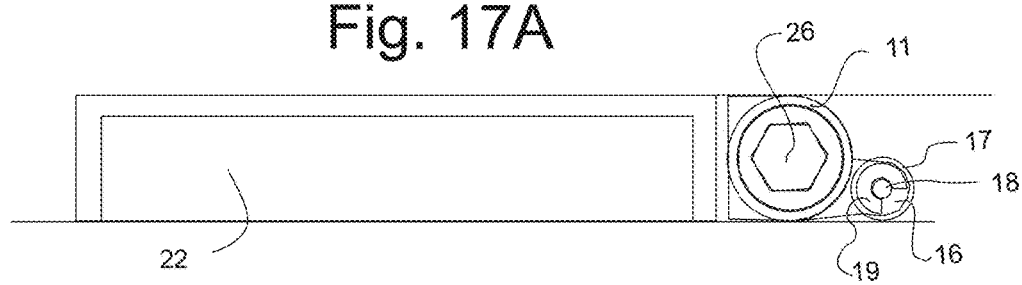
FIG. 17A to FIG. 17B Show a cross sectional view of a preferred embodiment with short lever arm with a wheel.
Figure 17B:
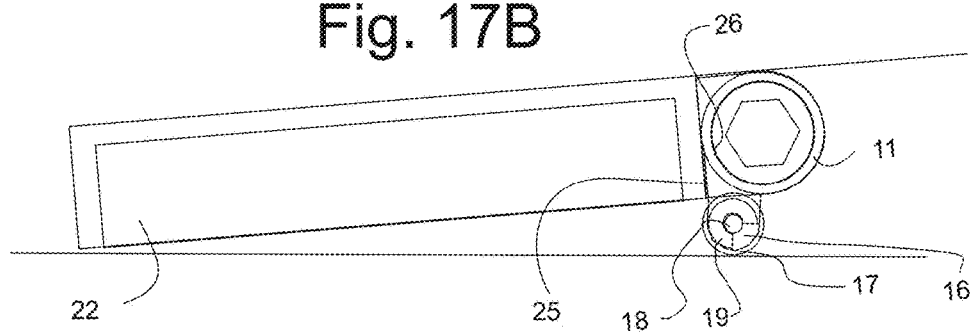
Figure 17C:
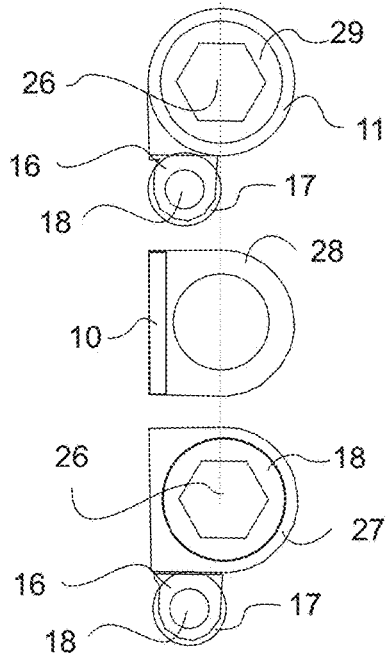
FIG. 17C to FIG. 17D Show an expanded view of a possible way to build the preferred embodiment.
Figure 17D:
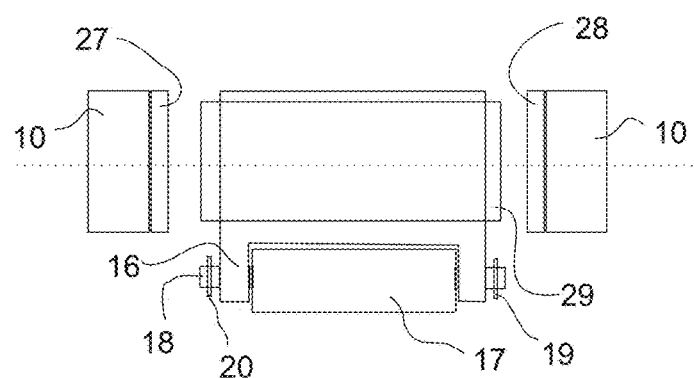

FIGS. 17 A to 17B shows a cross sectional view of an alternate embodiment and FIG. 17*c* shows an expanded view from the side and FIG. 17*d* an expanded view from the top.

FIG. 18A to 18B shows a cross sectional view of an alternate embodiment where the lever wheel 17 is very large to increase separation of the magnetic assembly 22 from the FHS 23. This view also shows that the current invention magnet release can be used on a vertical surface, and any angled surface or an upside down FHS. It is not depending gravity.

Figure 19A:
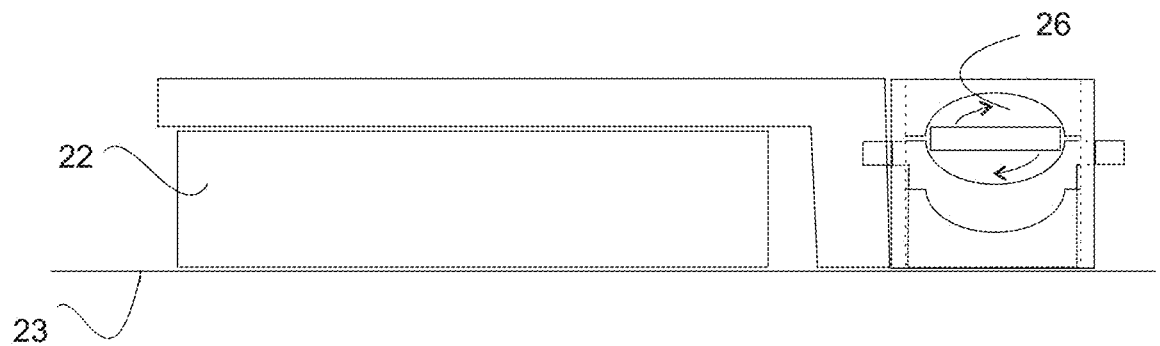
FIG. 19A to FIG. 19C Show a cross sectional view of a magnet release which is not an embodiment of this present invention, with cam shaped slot for a leverage tool to work as the cam and no magnetic contact area for holding the off position.
Figure 19B:
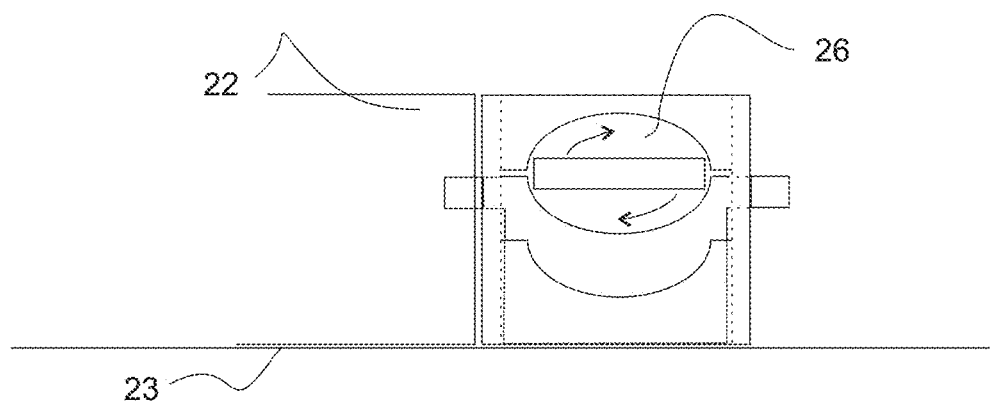
Figure 19C:
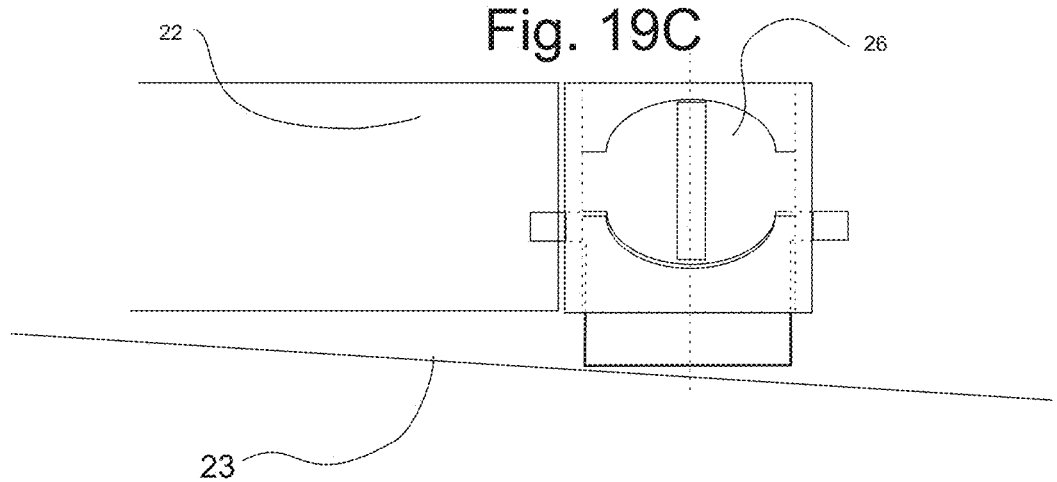

FIG. 19A to 19B shows a cross sectional view of a less desirable embodiment due to no in the off position, the magnet is still pulled towards a ferromagnetic holding surface by the magnetically attached opposite side of the magnet, the contact point at the end of lever 15 is forced straight towards the FHS and is not held in the off position when the leverage tool is removed, not being held toward the magnet due to force from the FHS and the position of the fulcrum of hinge barrel 11 also there is little or no contact with the magnet to hold the release in the off position once the leverage tool is removed.

Figure 20A:
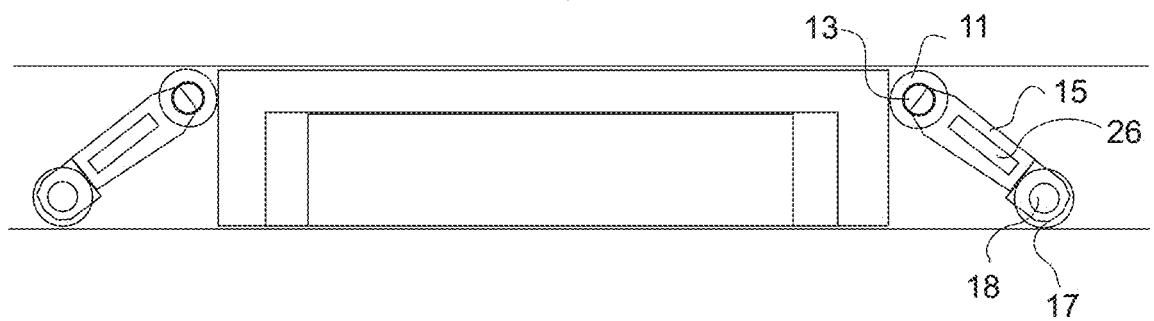
FIG. 20A to FIG. 20C Show a cross sectional view of a preferred embodiment with a leverage tool port in the lever arm, with a wheel at the end of the lever arm.
Figure 20B:
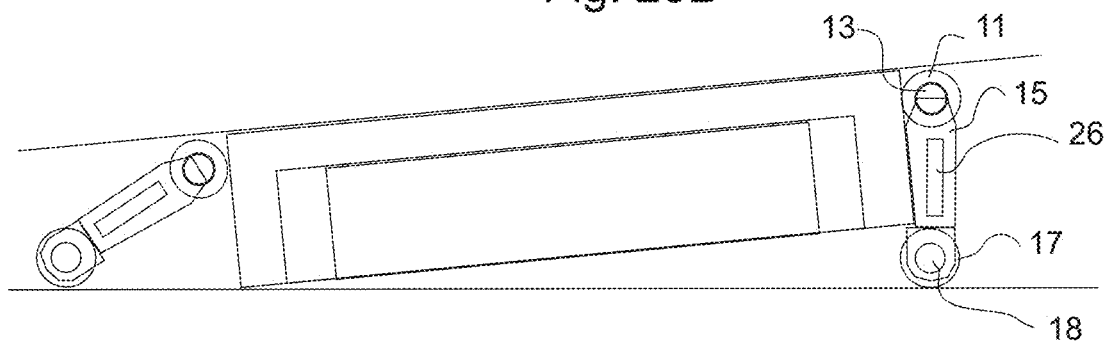
Figure 20C:
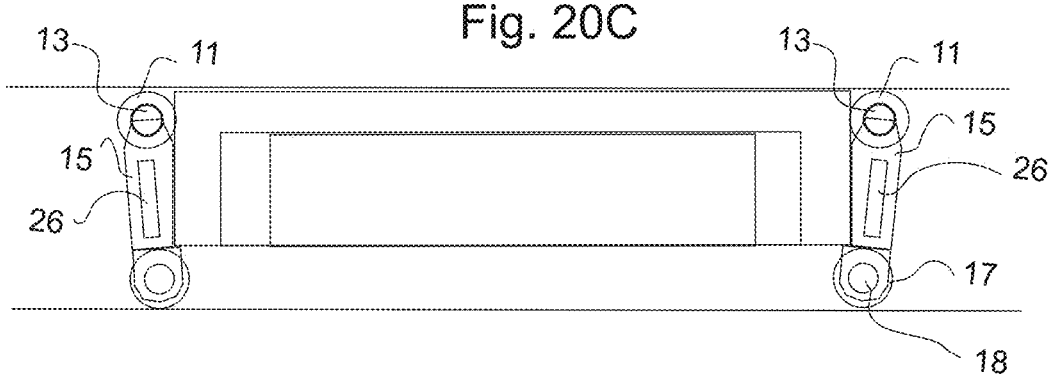

FIG. 20A through 20C show a cross sectional view of an additional preferred embodiment of this present invention, a magnet release embodiment most suited for releasing a strong magnetic assembly 22 while:

1) using the least amount of initial torque applied to the leverage tool port 26 to separate the magnetic assembly 22 from the FHS 23 as shown in FIG. 20*b*
2) separating the magnetic assembly 22 sufficiently to remove it from the ferromagnetic holding surface 23 by using a second magnet release on the opposite side of the magnet if needed.
3) in the off position, the magnet is still pulled towards a ferromagnetic holding surface by the magnetically attached opposite side of the magnet, the contact point at the end of lever 15 is forced toward the magnet due to force from the FHS and the position of the fulcrum of hinge barrel 11
4) making the angle of the lever arm A 15 being less than 90 degrees to the FHS 23 reduces the initial torque needed to release the magnetic assembly 22 from FHS 23
5) protecting the FHS 23 coating, magnetic assembly 22 and cargo 21
6) fitting within the footprint between the FHS 23 and the cargo 21
7) using the least amount of parts and materials
8) not maximizing the leverage tool port size within the footprint between the FHS 23 and the cargo 21

FIG. 21A shows a cross sectional view of an additional embodiment of this present invention, a magnet release embodiment most suited for releasing a strong magnetic assembly 22 while:

1) using the least amount of initial torque applied to the leverage tool port 26 to separate the magnetic assembly 22 from the FHS 23 as shown in FIG. 20*b*
2) separating the magnetic assembly 22 sufficiently to remove it from the ferromagnetic holding surface 23 by hand.
3) in the off position, the magnet is still pulled towards a ferromagnetic holding surface by the magnetically attached opposite side of the magnet, the contact point at the end of lever 16, the center line of fulcrum 32 is forced toward the magnet due to force from the FHS and the position of the center line of fulcrum 31 on the hinge barrel 11.
4) making the angle of the lever arm A 15 initial contact point 32 center line of lever force against 23 FHS as close to 0 degrees to the FHS 23 reduces the initial torque needed to release the magnetic assembly 22 from FHS 23
5) Not protecting the FHS 23 coating, magnetic assembly 22 and cargo 21
6) fitting within the footprint between the FHS 23 and the cargo 21
7) using less parts and materials than other internal magnet release devices
8) maximizing the leverage tool port size within the footprint between the FHS 23 and the cargo 21

FIG. 21B shows across sectional view of the Lever Arm B 16 engaged to separate and securely held by magnetic contact area 25 in the magnetic off position.

Figure 22A:
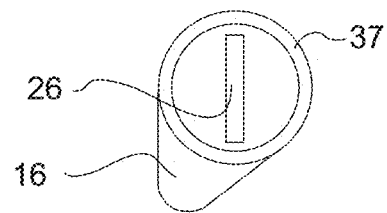
FIG. 22A to FIG. 22D Show some of the possible different leverage tool ports or leverage connections FIG. 23A and FIG. 23B Show the expanded and cross sectional views of a preferred embodiment of this invention with maximized separation, with the minimized number of parts (3).

FIG. 22A Shows an end view of an alternate flat head type of leverage tool port 26 and an additional embodiment of a leverage bolt type 37 and with the lever arm B 16 short for the maximum initial torque requirement to separate. This embodiment has the weakness of shorter separation distance between magnetic assembly 22 and FHS 23. This embodiment does not protect the FHS 23 surface coating unless an antifriction method or casing is added, as discussed earlier.

This embodiment requires at least 3 additional weld spots and a hinge barrel 11 not shown. Many types of leverage tool port 26 can be offered.

Figure 22B:
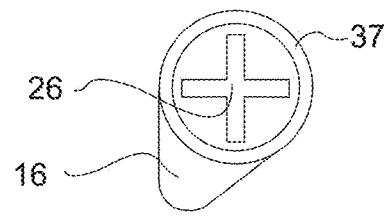

FIG. 22B Shows an end view of an alternate cross type of leverage tool port 26

Figure 22C:
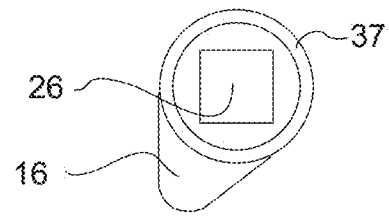

FIG. 22C Shows an end view of an alternate square type of leverage tool port 26

Figure 22D:
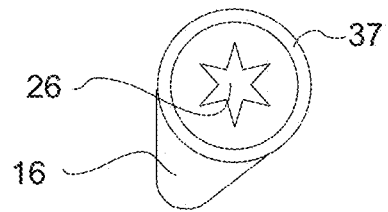

FIG. 22D Shows an end view of an alternate star type of leverage tool port 26

Figure 23A:
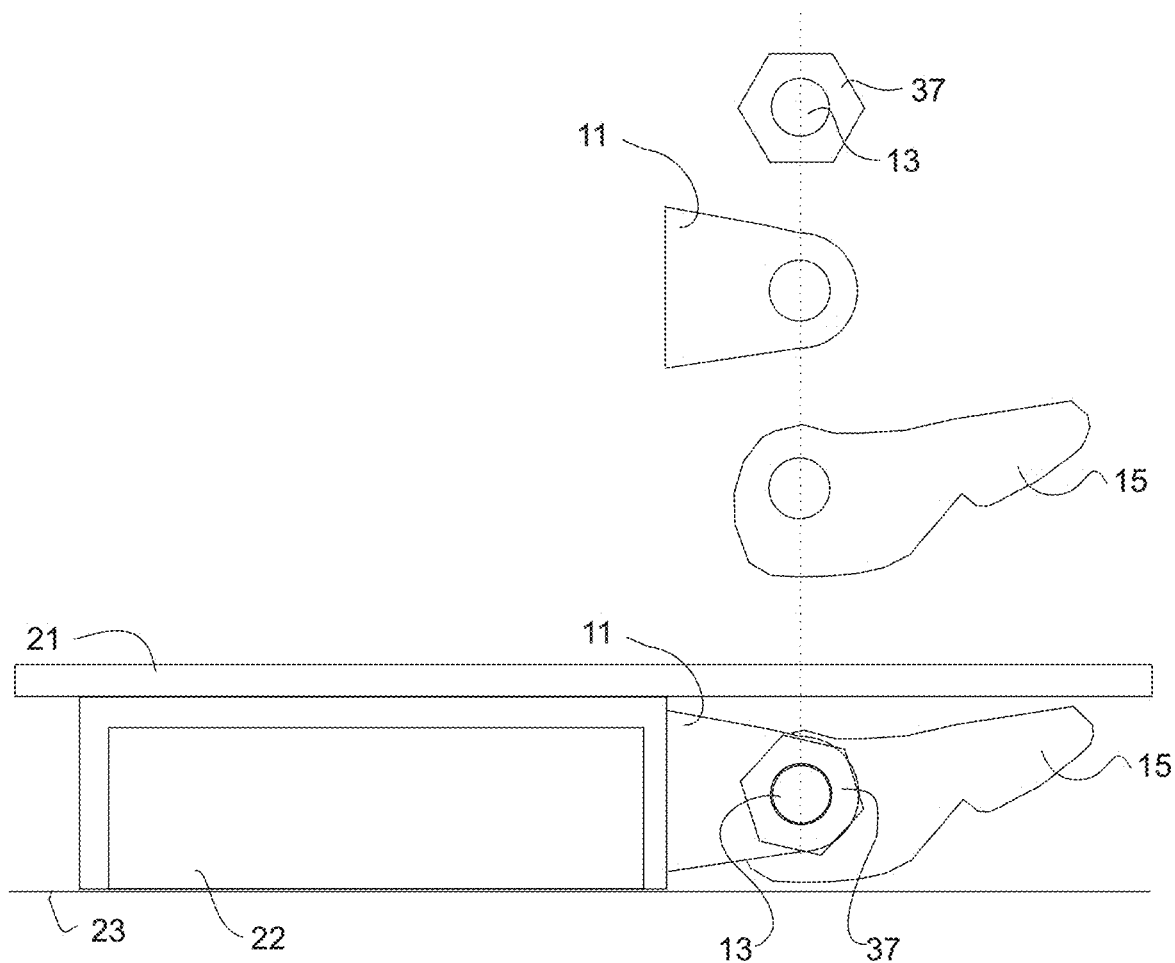
Figure 23B:
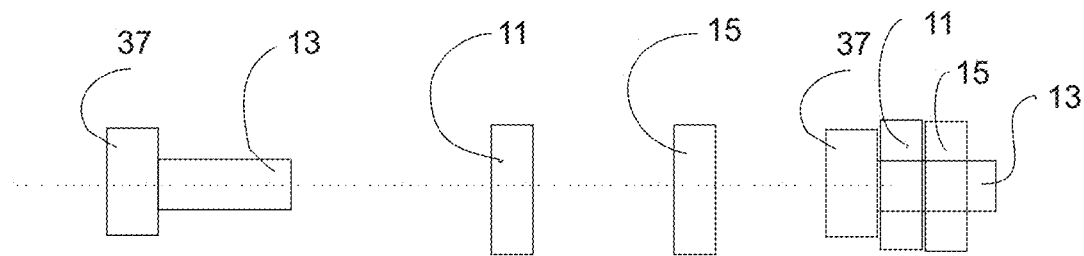

FIG. 23A Shows an expanded side view of a preferred embodiment of this present invention with the first portion of the lever arm 15 shaped for minimum initial torque requirement on the leverage tool but after the majority of the magnetic pull is overcome the second portion of the lever arm 15 is shaped to increase the separation distance between the magnetic assembly 22 and the FHS 23. FIG. 23*b* shows a cross sectional view of this preferred embodiment affixed to the magnetic assembly 22. FIG. 23*c* shows a cross sectional view of this preferred embodiment of this embodiment. This embodiment is with the least number of parts (3) and least number of welding spots (2).

FIG. 23B shows an expanded cross sectional view of the assembly of the lever arm A 15, the leverage bolt 37, the hinge post 13, the hinge barrel 11

Figure 24A:
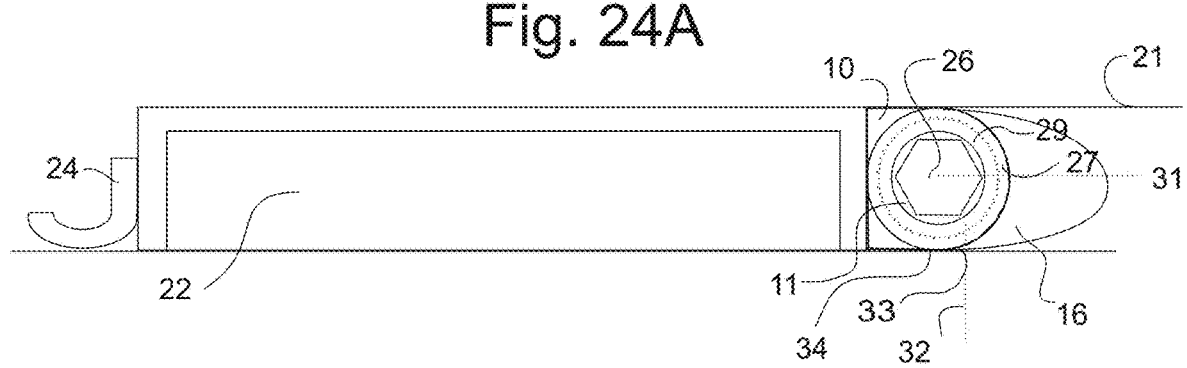
FIG. 24A to FIG. 24B Show a cross sectional view of a preferred embodiment with a long lever arm cam and a second lever on the side opposite of the magnet release.
Figure 24B:
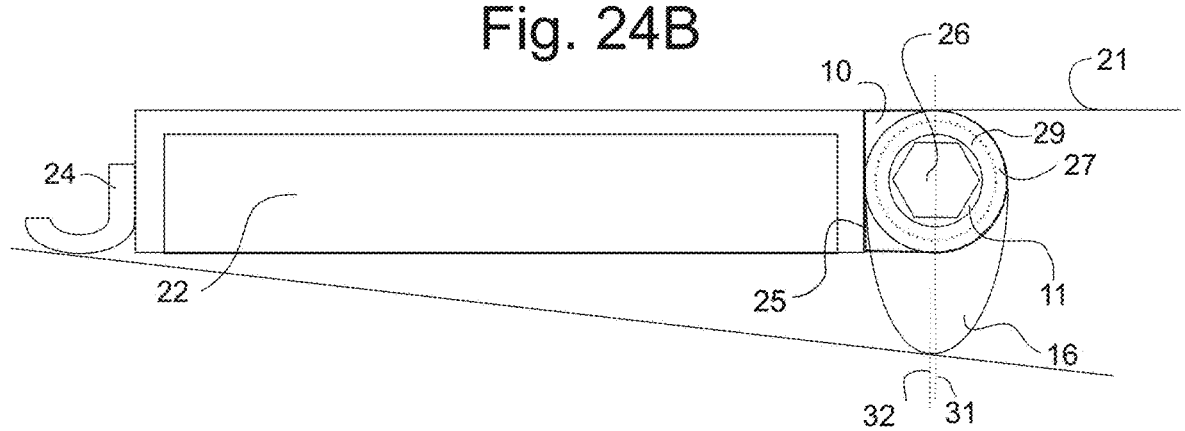

FIG. 24A Shows an expanded side view of an alternate embodiment of this present invention; a magnet release embodiment most suited for releasing a strong magnetic assembly 22 while:

1) using small amount of initial torque applied to the leverage tool port 26 to separate the magnetic assembly 22 from the FHS 23 as shown in FIG. 24*b*.
2) separating the magnetic assembly 22 sufficiently to remove it from the ferromagnetic holding surface 23 and for the opposite side to release using a "J" lever 24.
3) in the off position, while the magnetic assembly 22 is still pulled towards a ferromagnetic holding surface 23 by the magnetically attached opposite side of the magnetic assembly 22, the contact point at the end of lever 15 is forced toward the magnet due to force from the FHS and the position of the fulcrum of hinge barrel 11
4) increasing, within the first 30 degrees of rotation, as fast as possible the length of the radius of the cam of lever arm A 15, as the foot print will allow. The effort or initial torque required is less when the lever arm cam angle of force is less to the FHS 23 as a flat faced follower.
5) not protecting the FHS 23 coating, magnetic assembly 22 and cargo 21 unless some added antifriction method is added as discussed earlier.
6) fitting within the footprint between the FHS 23 and the cargo 21
7) using the least amount of parts and materials
8) maximizing the leverage tool port size within the footprint between the FHS 23 and the cargo 21

FIG. 24B shows across sectioinal view of the Lever Arm B 16 engaged to separate and securely held by magnetic contact area 25 in the magnetic off position.

Figure 25A:
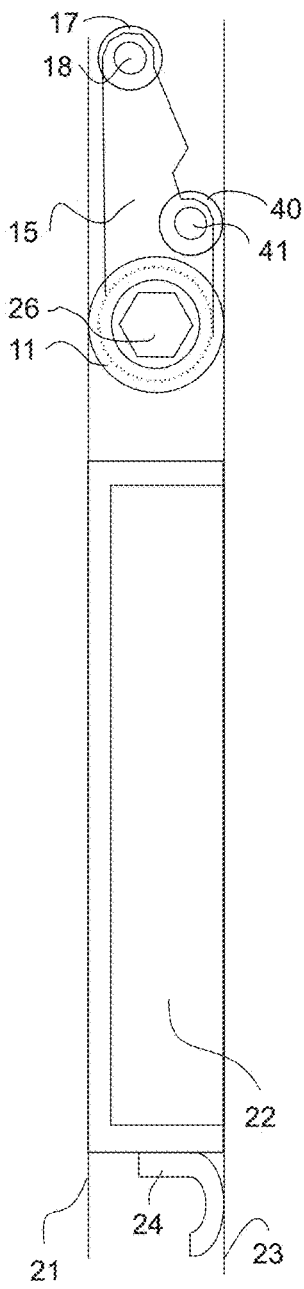
FIG. 25A to FIG. 25B Show a cross sectional view of a preferred embodiment with a long lever arm, two wheels, the hinge barrel and post further from the magnet and a second lever on the side opposite of the magnet release shaped like a "J".
Figure 25B:
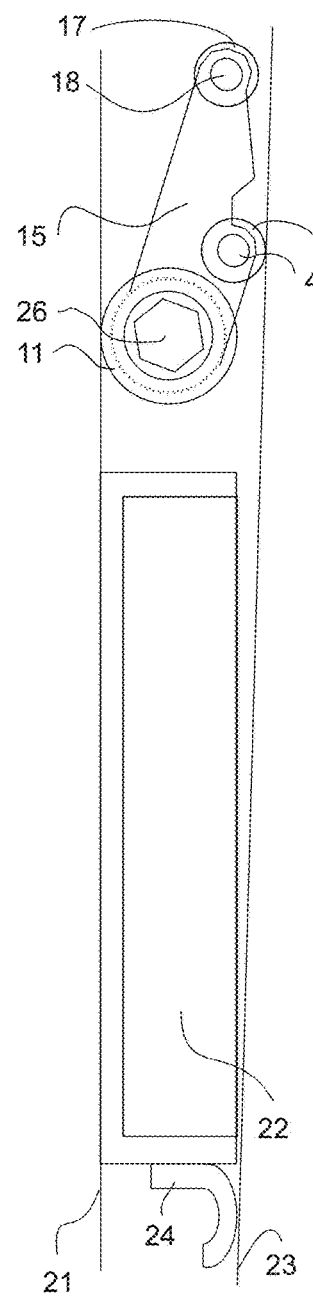

FIG. 25A Shows an expanded side view of an alternate embodiment of this present invention; a magnet release embodiment suited for releasing a magnetic assembly 22 with greater separation using a two wheels to reduce friction while:

1) using small amount of initial torque applied to the leverage tool port 26 to separate the magnetic assembly 22 from the FHS 23 as shown in FIG. 25*b*.

2) separating the magnetic assembly 22 sufficiently to remove it from the ferromagnetic holding surface 23 and the opposite being removed by hand
3) in the off position, the magnet 33 is still pulled towards a ferromagnetic holding surface a somewhat by the magnetically opposite side of the magnet, the contact point at the end of lever 15 the lever wheel 17 is forced toward the magnet due to force from the FHS and the position of the fulcrum of hinge barrel 11
4) making the fulcrum center at center of the leverage tool port 26 angle between that of the lever arm A 15 point of contact lever wheel close 40 with the FHS 23 being less than the 90 degrees to the FHS 23 reduces the initial torque needed to release the magnetic assembly 22 from FHS 23
5) protecting the FHS 23 coating, magnetic assembly 22 and cargo 21 with no added antifriction methods are added as discussed earlier.
6) fitting within the footprint between the FHS 23 and the cargo 21
7) using the more than the least amount of parts and materials
8) maximizing the leverage tool port size within the footprint between the FHS 23 and the cargo 21

FIG. 25B Shows a cross sectional view of an embodiment of the present invention with two wheels. The first wheel to separate the heaviest part of the release and having the most leverage and very little distance. The second wheel having a less heavy load but increasing the lifting distance. The first wheel is engaged here, but the second wheel has not yet engaged to separate.

Figure 25C:
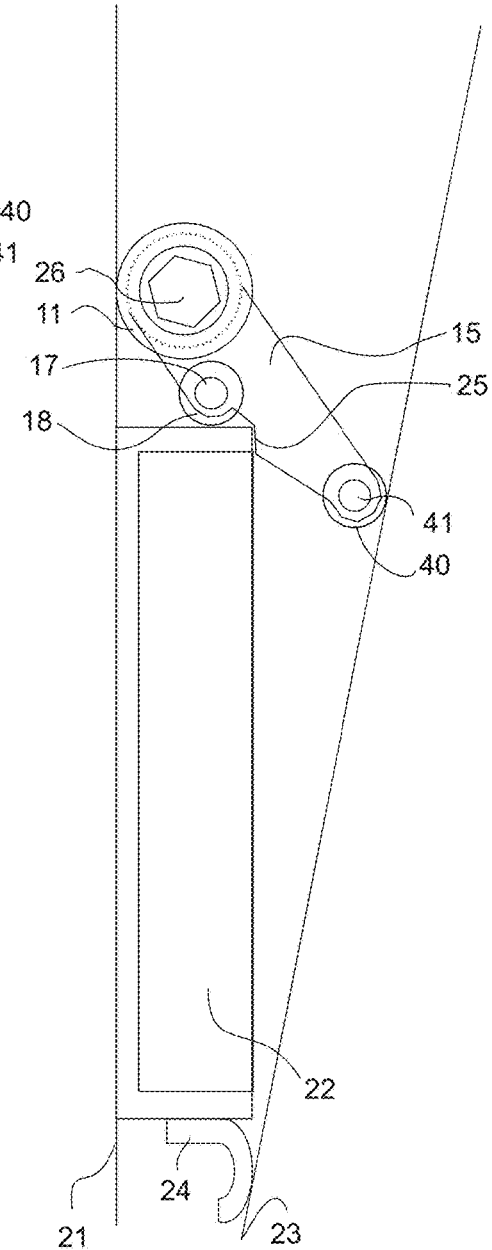

FIG. 25C Shows a cross sectional view of an embodiment of the present invention with two wheels. The first wheel to separate the heaviest part of the release and having the most leverage and very little distance. The second wheel having a less heavy load but increasing the lifting distance. The second wheel is engaged here and has traveled to make magnetic contact securely in the off position.

Figure 26A:
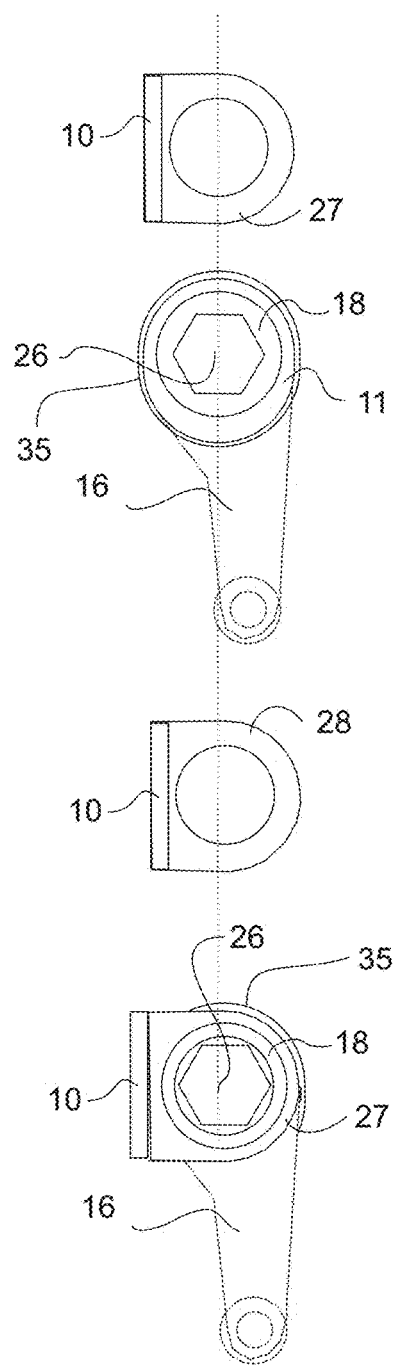
FIG. 26A to FIG. 26D Show a cross sectional view of a preferred embodiment with a long lever arm, a wheel and a belt
Figure 26B:
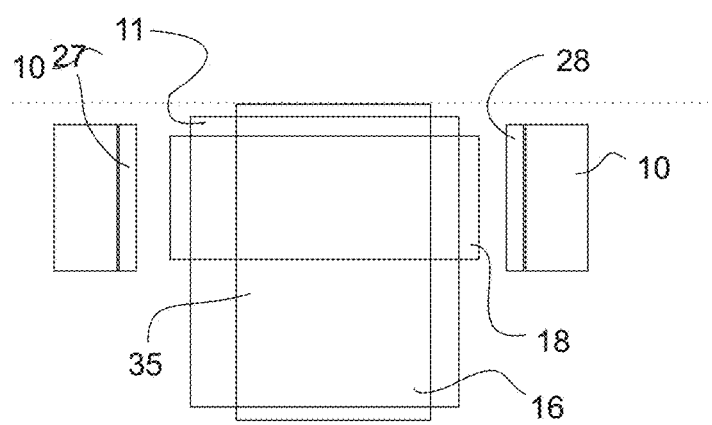
Figure 26C:
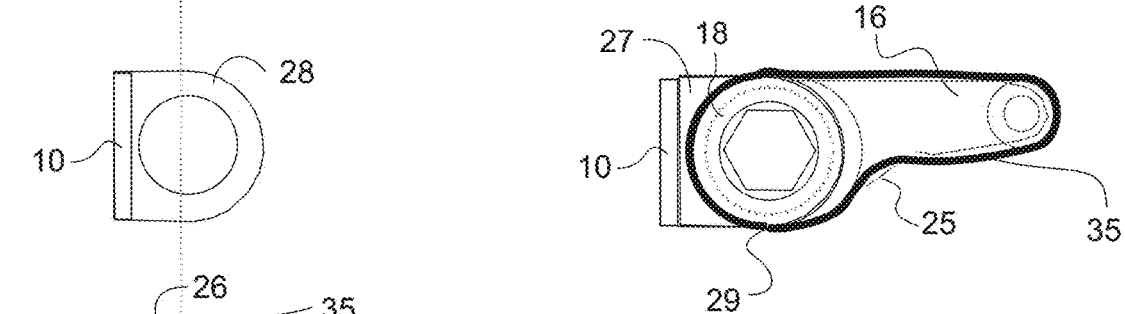
Figure 26D:
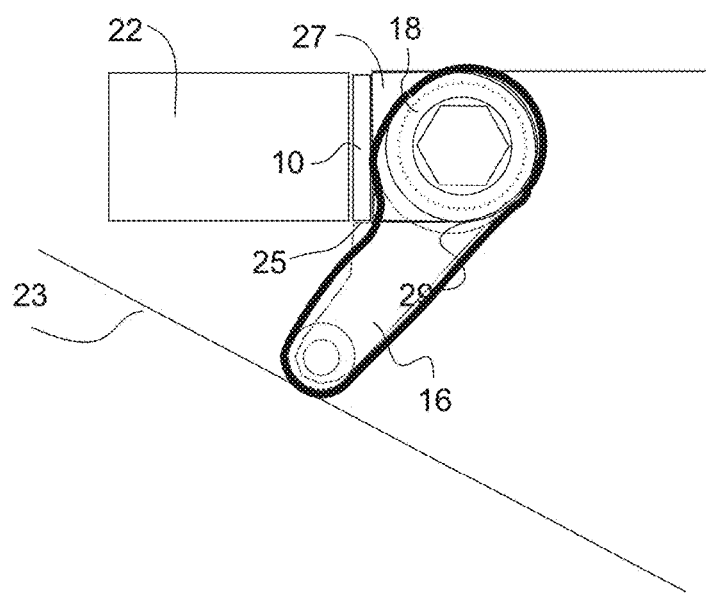
Figure 27:
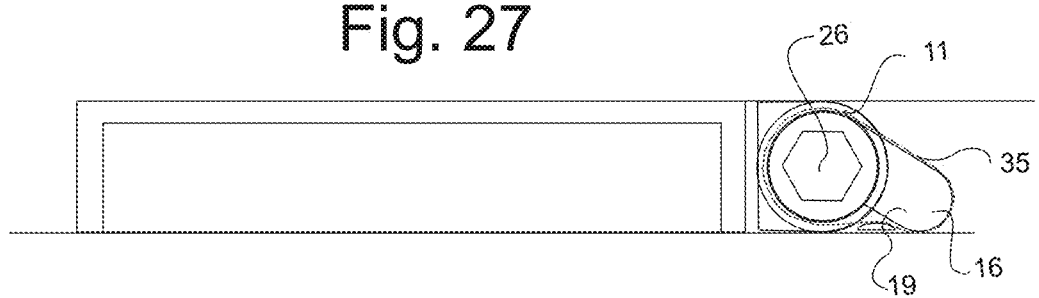
FIG. 27 shows a cross sectional view of an embodiment with a short lever arm B 16 and a belt 35.

FIG. 26A to FIG. 26B Show a cross sectional view of an embodiment with a long lever arm, a wheel and a belt FIG. 27 shows a cross sectional view of an embodiment with a short lever arm B 16 and a belt 35.

Figure 28A:
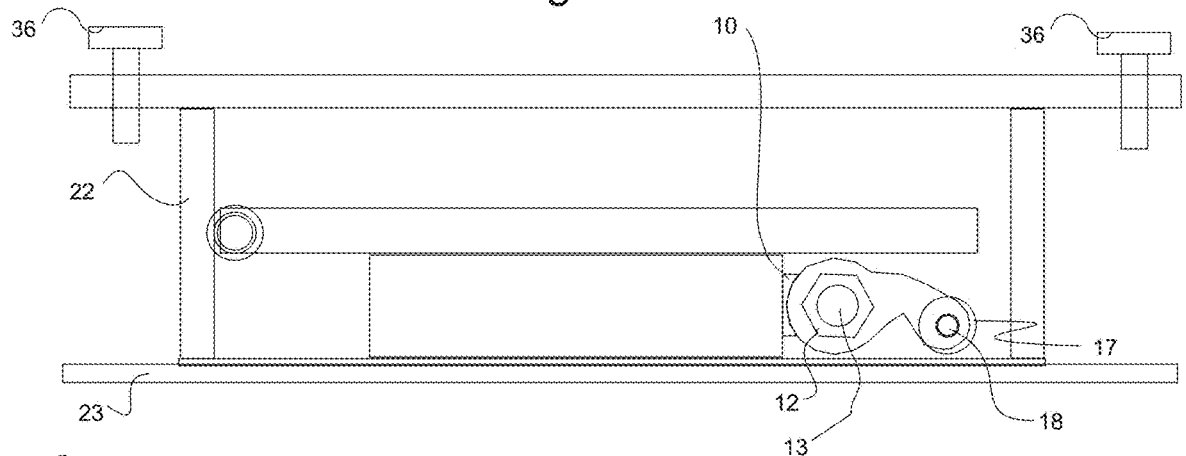
FIG. 28A to FIG. 28C shows a cross sectional view of an alternate embodiment with a magnetic assembly having a casing.
Figure 28B:
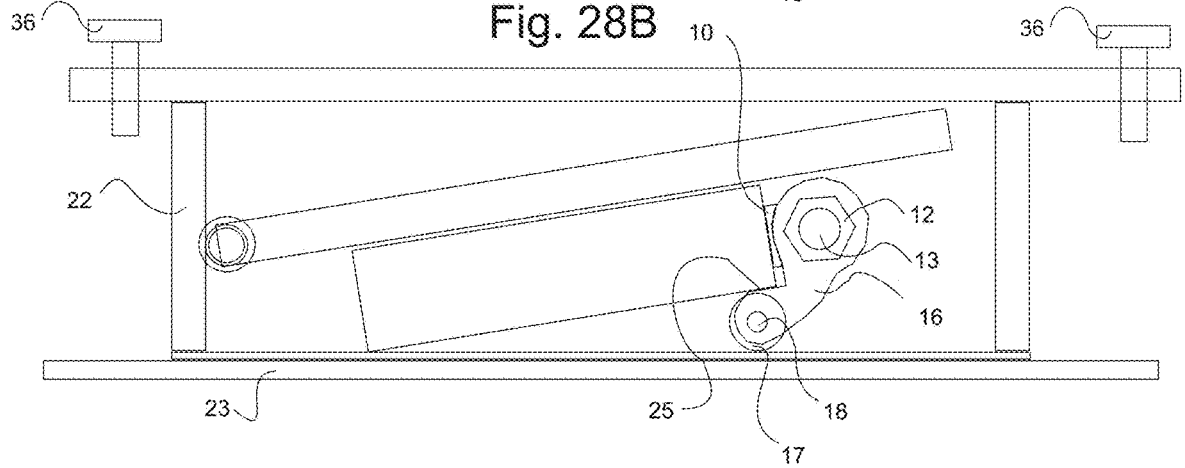
Figure 28C:
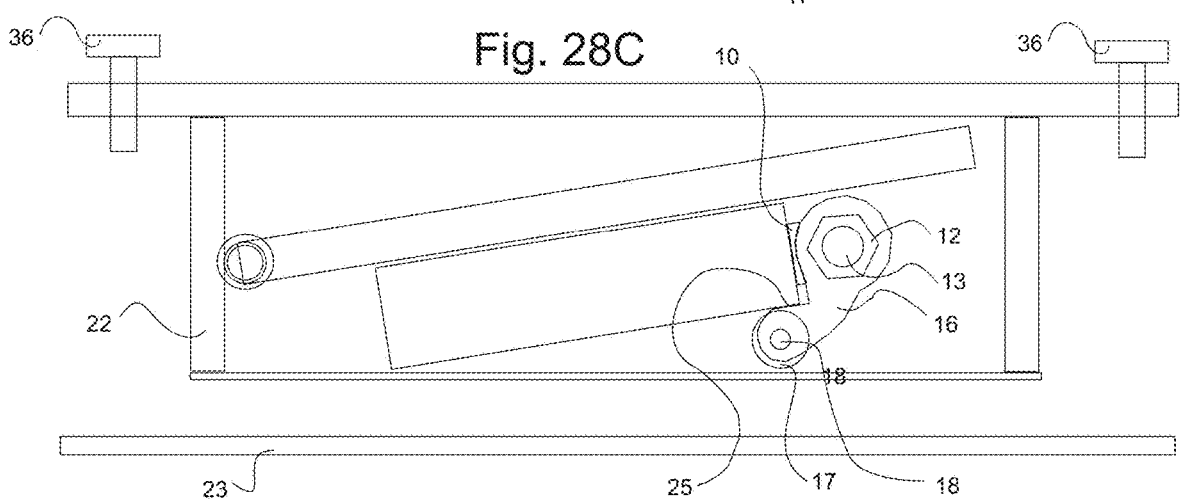

FIG. 28A to FIG. 28C shows a cross sectional view of an alternate embodiment with a magnetic assembly having a casing. FIG. 28A shows the magnetic assembly in the engaged position. The invention is then pressed against the inside of the casing of the magnetic assembly to protect the FHS 23 coating further. FIG. 29B shows the magnetic assembly in the mostly disengaged position. At this point the magnet has contact with the Magnetic Contact Area 25 to retain the assembly in the off position. FIG. 29C show the magnetic assembly removed safely from the FHS with no damage to the coating.

Advantages

From the description above, a number of advantages of my magnet release external to the permanent magnetic assembly become evident:
1) No need for additional magnet material to create a magnetic short circuit within the permanent magnetic assembly; conserves magnet material.
2) Allows the magnet material to be positioned as close as possible to the FHS or another permanent magnet assembly, in the optimum magnetic circuit of a holding magnetic assembly; conserves magnet material.
3) Allows the steel and stainless steel materials to be positioned as close as possible to the FHS or another permanent magnet assembly, it does not require additional steel to conduct the magnetism extra distance to reach the FHS. The magnetic assembly steel is in the optimum magnetic circuit of a holding magnet; conserves steel and stainless steel.
4) There is no internal mechanism to create air gaps and waste magnetism in the magnetic circuit; conserves magnet material.
5) Only 2 parts: the hinge post, the lever arm including a cam, and a place to connect a leverage tool and place to connect magnetically to the magnet assembly. See FIG. 11a to 11f
6) The device is clearly visibly on or clearly visibly off; simple to operate.
7) Serves multiple purposes:
    a. to separate the magnetic assembly from the ferromagnetic holding surface
    b. the off position fulcrum of the hinge barrel being aligned off center of the contact point of the lever arm wheel to force the lever arm forced towards the off position as the magnetic assembly is pulled towards a ferromagnetic holding surface
    c. to have an area on it to make contact with the magnetic assembly to be held magnetically from swinging to the on position accidentally.
    d. The release has the additional function of controlling the rate of attractive motion of the magnetic assembly to avoid damage of fingers, magnets or FHS coatings being damaged.
8) The device is low profile, with the leverage tool not attached, to avoid accidentally being released by someone or something passing by.
9) The removable leverage tool, when removed makes it difficult to operate by vandals or thieves to remove the load attached to the magnet.
10) The has no need for a lever arm pass through area or rotational arm pass through area into the magnets internal workings, which prevents chemicals, moisture, debris and oxidation; elimination of parts.
11) The leverage works toward the magnetic pull of the magnet and does take advantage of the magnetic pull to assist in moving the lever into the release (off) position.
12) The lever design takes advantage of the magnetic assembly's own attraction to hold the magnet release lever safely in the (off) position. No springs needed; elimination of parts.
13) The magnet release device keeps a low profile. Operation does not extend past the surface plain of the magnetic assembly's magnetically holding face while the magnetic release is in the on position, the magnet release also does not extend past the surface plain of the magnetic assembly's non-magnetic holding face; the face opposite the holding face, while in the off position, therefore cargo mounted to the magnetic assembly's non-magnetic holding face with a surface shape that is mostly flat will not hinder the magnet release motion. The leverage tool is not attached and is therefore inserted from a length that will not contact the FHS or the cargo.
14) There is less torque force required to move one edge of the magnetic assembly away from the FHS than to remove two or more edges at the same time. However once one edge is moved away the remaining edge has little holding force.
15) The cargo load remains attached to the magnetic assembly during operation of the leverage tool in the leverage tool port. This avoids damage to the cargo attachment method, the magnetic assembly and the FHS surface coatings from a pry bar or manually dragging the magnetic assembly off. Several methods of protecting the FHS surface coating may be added: at least one wheel, a belt, a lubricant, a casing, a cloth, anti-friction plastics, graphite, etc.

Operation—FIGS. 11a to 11f

The manner of using the magnet release is to first attach hinge post 13 to magnetic assembly 22 then second to attach lever arm A 15 to pivot on hinge post 13. Then third to attach leverage tool example 42 to the lever arm A 15. Apply torque to leverage tool example 42 and lever arm A 15 to rotate lever arm A 15 until it stops on contact with magnetic assembly 22 at magnetic contact area 25. Remove magnetic assembly 22 by hand from FHS 23. To safely re-apply the magnetic assembly 22 to a FHS 23 reverse the procedure of course.

Alternatively embodiments similar to FIGS. 13a, 15a, 17a, 18a, 20a, 25a, 26a at least one lever wheel 17 and lever wheel axel 18 or at least one belt 25 may be added to the Lever arm A 15 and/or lever arm B 16, in order to reduce the friction and the torque required. The lever wheel 17 at the same time protects the FHS 23, the magnetic assembly 22 and the cargo 21 surface finishes.

Alternatively embodiments similar to all Figs. shown can have at least the following parts shuffled to change the position or the order of the cam shaft, the effort and the load. At least the following parts may also be permanently affixed or to rotate on the magnetic assembly 22: hinge post 13, hinge barrel 11, lever arm A 15, lever wheel 17.

CONCLUSIONS, RAMIFICATIONS AND SCOPE

Accordingly the reader will read and see that the magnet release of this present invention can be used to remove a strong magnet with less effort, store the magnet safely in the off position and replace a strong magnet safely in the on position.

1) It negates the need for additional magnet material to create a magnetic short circuit. It optimizes the shortest distance in the magnetic circuit of the permanent magnetic assembly to the FHS or another permanent magnetic assembly. It allows the optimum magnetic circuit of a holding magnet, without wasting magnet material;
2) It has no air gap(s) that moves the magnet material further from the FHS. This allows the magnet material to be positioned as close as possible to the FHS or another permanent magnet assembly, in the optimum magnetic circuit of a holding magnetic assembly, without air gaps;
3) It does not require the magnet to be inside an oversized steel or stainless steel or plastic housing that creates distance between the magnet material and the FHS. It allows the optimum magnetic circuit of a holding magnet, without wasting steel;
4) It has no internal mechanisms that move the magnet material further from the FHS. This allows the magnet material to be positioned as close as possible to the FHS or another permanent magnet assembly, in the optimum magnetic circuit of a holding magnetic assembly, without internal mechanisms;
5) The design of the hinge post and the lever arm allow it to have few parts and materials. Only two parts are needed the hinge post and the lever arm. Which are small enough to fit in the low profile between the top and bottom of the magnet.
6) It is clearly visibly on or clearly visibly off by looking at the mechanism.
7) The lever arm design accomplishes multiple purpose in one part: 1) to attach in a rotate able manner to the magnet, 2) to separate the magnet from the ferromagnetic holding surface with a cam or wheel to reduce effort 3) the off position fulcrum of the hinge barrel being aligned off center of the contact point of the lever arm wheel to force the lever arm towards the off position as the magnetic assembly is pulled towards a ferromagnetic holding surface, 4) to make contact with the magnet to be held magnetically from swinging to the on position accidentally, 5) to have a port or post to connect to a standard leverage tool, to create distance between the magnet and the FHS in a stable way;
8) The leverage tool is easily removable and the lever arm(s) are low profile to avoid accidentally being released by a child or something passing by;
9) The leverage tool is easily removable, which when removed makes it difficult to be released by vandals or thieves to remove the cargo attached to the magnet;
10) It has no need for a lever arm pass through or rotational arm pass through into the magnets internal workings, to prevent chemicals, moisture, debris and oxidation. A seal is not needed around the lever and handle entry point in this external design.
11) The effort leverage moves toward the magnetic pull of the magnet. It takes advantage of the magnetic pull to assist in moving the lever into the release (off) position.
12) It takes advantage of the magnets own attraction to hold the lever arm magnetic contact area safely in the (off) position.
13) It does not extend past the surface plain of the magnetic assembly's magnetically holding face while the magnetic release is in the on position, the magnet release also does not extend past the surface plain of the magnetic assembly's non-magnetic holding face; the face opposite the holding face while in the off position, therefore cargo mounted to the magnetic assembly's non-magnetic holding face with a surface shape that is mostly flat will not hinder the magnet release motion.
14) It moves one edge of the magnetic assembly away from the FHS first making it easy to remove the second edge. Much easier than to remove whole magnet at one time.
15) It does not requiring removal of the cargo load attached to the magnetic assembly to operate the leverage tool in the leverage tool port and avoids damage to the cargo, the magnetic assembly and the FHS surface coatings.
16) It has the additional purpose of controlling the rate of attractive motion of the magnetic assembly towards the FHS, to avoid damage of fingers, magnets or FHS coatings being damaged.
17) It will avoid damage to the finished surface of the magnet, the FHS and the cargo. It can use many type of antifriction methods to protect the surface the wheel being preferred.
18) It has leverage tool ports that are accessible from two sides in case something is blocking one side. If for example cargo or the ferromagnetic holding surface (FHS) or a wall is blocking one side then the other side may be used to access and actuate the magnet release.
19) It allows the magnet and steel assembly to be designed specifically for a thin ferromagnetic holding surface (FHS). On a thin steel FHS like a file cabinet, tool chest or refrigerator the magnet and steel are efficiently designed close to the FHS. Then the mechanism to release magnetic assemblies is attached to the periphery or somewhere to not make the magnetic design thicker than needed.

Although the descriptions above have many specifications, these should not be construed a limiting the scope of the invention, but as merely providing illustrations of some of the presently preferred embodiments of this invention. For example the magnet release can have added at least one wheel, a belt, a lubricant, a casing, a cloth, paper, antifriction plastics, graphite.

Thus the scope of the invention should be determined by the appended claims and their legal equivalents, rather than by the examples given.

I claim:

1. In a magnet release of the type comprising:
   at least one hinge barrel or at least one hinge post to be affixed to the side of a magnet and
   at least one lever arm with a means to connect to said at least one hinge barrel or said at least one hinge post in a rotating connection towards said magnet and away from said magnet,
       said lever arm also with means of separating said magnet from a ferromagnetic holding surface by lever contact area, said magnet release also with at least one means to connect a leverage tool,
   said lever arm also with at least one area for magnetic contact comprised of a ferromagnetic material that will contact said magnet at the magnetic contact area when said lever arm is rotated toward said magnet and hold said lever arm magnetically in an "off" position or position whereby
       said magnet is distanced from said ferromagnetic holding surface, while partially short-circuiting said magnet, thereby releasing said magnet substantially magnetically from said ferromagnetic holding surface, whereby
       said magnet may be removed from said ferromagnetic holding surface and stored safely;
           while said lever arm is held in contact with said magnet the end of said lever arm will have means to hold said magnet away from said ferromagnetic holding surfaces by lever contact area,
       said magnet release, in an "on" position or position whereby said magnet is not distanced from said ferromagnetic holding surface, fits between the thickness of said magnet.

2. The release of claim 1 wherein said means of separating is a cam shaped section of said lever arm.

3. The release of claim 1 wherein said means of separating is said at least one wheel located at the end of said lever arm and another said wheel near the beginning of said lever arm.

4. The release of claim 1 wherein said means of separating is at least one wheel and is located on of said lever arm.

5. The release of claim 1 wherein said means of separating is a cam shaped section of said lever arm covered with means of reducing friction.

6. The release of claim 1 whereby said means of reducing friction is a lubricant, wax, tape, plastic, cloth, paper, graphite, a bearing, a belt or any similar means.

7. The release of claim 1 wherein said means to connect a leverage tool is a port or a post shaped like an rectangular slot, across, a hexagon, a star, a square or any similar means.

8. The release of claim 1 wherein said lever arm is one integral part made of steel with means to connect to said at least one hinge barrel or said at least one hinge post, said means of separating, said means to connect a leverage tool, said area for magnetic contact and said means to hold said magnet away from said ferromagnetic holding surface.

9. The release of claim 1 wherein a second lever arm is affixed to the opposite side from said magnet release with means to assist with the separation of the opposite side.

10. The release of claim 1 whereby said means to assist with the separation of the opposite side is a nonmagnetic conducting material in a "J" shape, a right angle shape, a tube, a rod or any similar shape that will make contact with the ferromagnetic holding surface before the opposite magnet edge when the side of the release is separated from said ferromagnetic holding surface.

11. The release of claim 1 wherein said leverage tool is a threaded fastener and angle bracket affixed to said magnet.

12. The release of claim 1 wherein the present invention is affixed to said at least one magnet where said magnet is part of a magnetic assembly and said invention is mounted upon the periphery of said magnetic assembly.

13. The release of claim 1 wherein the present invention provides a similar device affixed to said at least one magnet where said magnet is part of a magnetic assembly and said invention is mounted within the periphery of said magnetic assembly by means which does not affect the magnetic assembly holding force losses by more than 5%.

* * * * *